United States Patent
Fujita et al.

(10) Patent No.: US 7,366,805 B2
(45) Date of Patent: Apr. 29, 2008

(54) DATA TRANSFER CONTROL SYSTEM, ELECTRONIC INSTRUMENT, PROGRAM, AND DATA TRANSFER CONTROL METHOD

(75) Inventors: Shinichiro Fujita, Kitakyushu (JP); Hiroyuki Kanai, Shiojiri (JP); Koji Nakao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 523 days.

(21) Appl. No.: 10/885,139

(22) Filed: Jul. 7, 2004

(65) Prior Publication Data

US 2005/0076165 A1    Apr. 7, 2005

(30) Foreign Application Priority Data

Oct. 6, 2003    (JP)    ............... 2003-347149

(51) Int. Cl.
G06F 3/00    (2006.01)
G06F 5/00    (2006.01)
(52) U.S. Cl. .......................... 710/58; 710/59
(58) Field of Classification Search ............ None
See application file for complete search history.

(56) References Cited

U.S. PATENT DOCUMENTS 6,636,922 B1 * 10/2003 Bastiani et al. ............. 710/305
6,937,355 B1 * 8/2005 Miyazawa et al. ......... 358/1.14
2001/0042141 A1 * 11/2001 Matsunaga et al. ............ 710/1
2003/0145150 A1 * 7/2003 Yoshida ..................... 710/315
2006/0002314 A1 * 1/2006 Fukunaga et al. .......... 370/257

FOREIGN PATENT DOCUMENTS

| JP | A 2001-076423 | 3/2001 |
| JP | 2001-177537   | 6/2001 |
| JP | A 2001-257703 | 9/2001 |

\* cited by examiner

*Primary Examiner*—Alford Kindred
*Assistant Examiner*—David Martinez
(74) *Attorney, Agent, or Firm*—Oliff & Berridge, PLC

(57) ABSTRACT

A data transfer control system includes a buffer controller that controls access to a data buffer and a transfer controller that controls data transfer between a PC connected to a BUS1 and the logical units LUN1 and LUN2 connected to a BUS2. The transfer controller includes: a command processing section that starts data transfer to or from the LUN1 based on a command indicated by an ORB for the LUN1 when the ORB is received, and starts data transfer to or from the LUN2 based on a command indicated by an ORB for the LUN2 when the ORB is receive; and a wait processing section that waits the processing of the ORB for the LUN2, when a bus reset occurs during the processing of the ORB for the LUN1 and the ORB for the LUN2 is received after the bus reset has occurred.

13 Claims, 22 Drawing Sheets

LOG-IN ORB

LOG-IN RESPONSE

RECONNECTION ORB

DATA TRANSFER CONTROL SYSTEM, ELECTRONIC INSTRUMENT, PROGRAM, AND DATA TRANSFER CONTROL METHOD

Japanese Patent Application No. 2003-347149, filed on Oct. 6, 2003, is hereby incorporated by reference in its entirety.

BACKGROUND OF THE INVENTION

The present invention relates to a data transfer control system, an electronic instrument, a program, and a data transfer control method.

An interface standard called IEEE 1394 has recently attracted attention. A bus reset occurs if an electronic instrument is connected anew to the bus, an electronic instrument is removed from the bus, or the number of nodes connected to the bus increases or decreases. When a bus reset occurs, the node topology information is cleared and then the topology information is automatically reset. Since the bus topology is reset automatically after a reset, IEEE 1394 makes it possible to insert and remove cables in a hot state (hot plug).

Techniques have been disclosed in the art for solving various problems caused by the occurrence of such a bus reset, such as that of Japanese Patent Application Laid-Open No. 2001-177537. However, this prior-art technique does not consider a case in which the target has a plurality of logical units.

BRIEF SUMMARY OF THE INVENTION

One aspect of the present invention relates to a data transfer control system for transferring data through a bus, the data transfer control system including:

a buffer controller which controls access to a data buffer in which transfer data is temporarily stored; and a transfer controller which controls data transfer between a device connected to a first bus and a plurality of logical units connected to a second bus, the plurality of logical units including a first logical unit and a second logical unit, wherein the transfer controller includes:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when a bus reset occurs during the processing of the command packet for the first logical unit and a command packet that is received after the bus reset occurs is the command packet for the second logical unit.

Another aspect of the present invention relates to a data transfer control system for transferring data through a bus, the data transfer control system including:

a buffer controller which controls access to a data buffer in which transfer data is temporarily stored; and a transfer controller which controls data transfer between a device connected to a first bus and a plurality of logical units connected to a second bus, the plurality of logical units including a first logical unit and a second logical unit, wherein the transfer controller includes:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when the command packet for the second logical unit is received while the second bus is being used by the first logical unit.

DETAILED DESCRIPTION OF THE EMBODIMENT

Figure 1:
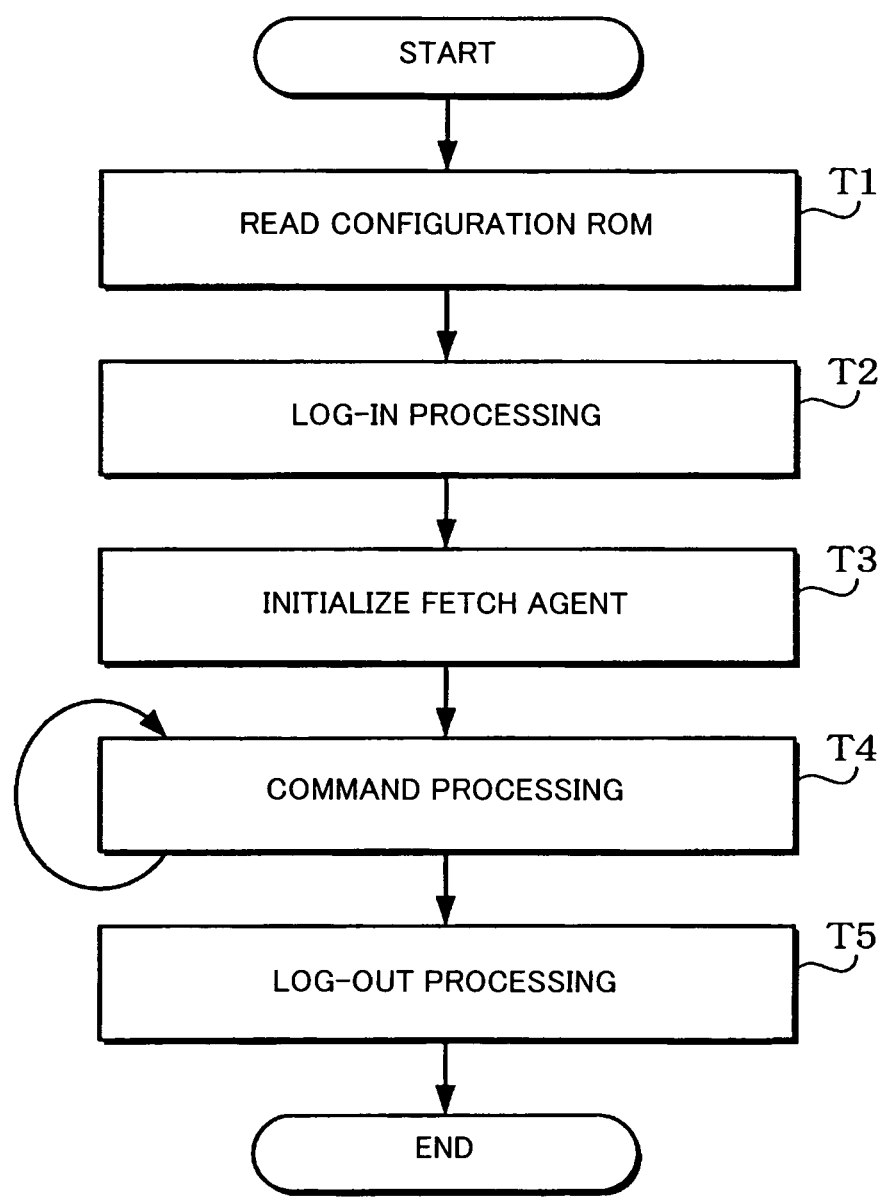
FIG. 1 is illustrative of details of SBP-2 processing.

Embodiments of the present invention will be described below.

One embodiment of the present invention provides a data transfer control system for transferring data through a bus, the data transfer control system including:

a buffer controller which controls access to a data buffer in which transfer data is temporarily stored; and a transfer controller which controls data transfer between a device connected to a first bus and a plurality of logical units connected to a second bus, the plurality of logical units including a first logical unit and a second logical unit, wherein the transfer controller includes:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when a bus reset occurs during the processing of the command packet for the first logical unit and a command packet that is received after the bus reset occurs is the command packet for the second logical unit.

With this embodiment, when a command packet for a first logical unit is received from a device connected to a first bus, data transfer starts to or from the first logical unit connected to the second bus. When a command packet for a second logical unit is received from the device connected to the first bus, on the other hand, data transfer starts to or from the second logical unit connected to the second bus. This embodiment also ensure that, if a bus reset occurs during the processing of a command packet for the first logical unit and a command packet for the second logical unit is received after the bus reset occurs instead of a command packet for the first logical unit, the processing of the command packet for the second logical unit is made to wait. This configuration makes it possible to prevent a situation that makes it impossible to maintain the continuation of data transfer in accordance with a command packet for the first logical unit that was being processed before the bus reset occurred. It therefore makes it possible to implement suitable data transfer control between a device connected to the first bus and a plurality of logical units, even when a plurality of logical units are connected to the second bus.

With this data transfer control system, the wait processing section may perform processing to restart data transfer to or from the first logical unit, when a bus reset occurs during the processing of the command packet for the first logical unit and a command packet that is received after the bus reset occurs is the command packet for the first logical unit.

This feature makes it possible to maintain the continuation of data transfer in accordance with a command packet for the first logical unit that was being processed before the bus reset occurred.

With this data transfer control system, the wait processing section may wait processing of the command packet for the second logical unit for a predetermined time, when a bus reset occurs during the processing of the command packet for the first logical unit and a command packet that is received after the bus reset occurs is the command packet for the second logical unit, and issues an error status with respect to the device connected to the first bus when a wait state is not canceled even after processing has waited for the predetermined time.

This feature makes it possible to prevent a situation in which the processing of the command packet for the second logical unit is in a wait state over a long period of time and has adverse effects on the processing of the device that is connected to the first bus.

With this data transfer control system, the wait processing section may cancel a wait state of the processing of the command packet for the second logical unit, when a bus reset occurs during the processing of the command packet for the first logical unit and the device connected to the first bus does not succeed with a reconnection request performed for the first logical unit after the bus reset occurs.

Since this feature makes it possible to cancel the wait state without any waste of time after the reconnection request has been unsuccessful, enabling more efficient processing.

Another embodiment of the present invention provides a data transfer control system for transferring data through a bus, the data transfer control system including:

a buffer controller which controls access to a data buffer in which transfer data is temporarily stored; and a transfer controller which controls data transfer between a device connected to a first bus and a plurality of logical units connected to a second bus, the plurality of logical units including a first logical unit and a second logical unit, wherein the transfer controller includes:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when the command packet for the second logical unit is received while the second bus is being used by the first logical unit.

With this embodiment, if a command packet for the second logical unit is received when the second bus is being used by the first logical unit, the processing of that command packet for the second logical unit is made to wait. It therefore becomes possible to implement suitable data transfer control between a device connected to the first bus and a plurality of logical units, even when a plurality of logical units are connected to the second bus.

With any of the above data transfer control systems, the transfer controller may include a command abort section which aborts a command issued by a logical unit among the plurality of logical units, the command processing section may issue the command indicated by the command packet to the logical unit connected to the second bus, and may start DMA transfer to or from the logical unit, when a command packet is received from the device connected to the first bus, and the command abort section may abort the command that has been issued to the logical unit connected to the second bus based on the command packet, after the DMA transfer started by the command packet has been completed.

With this feature, commands that were issued to logical units (first and second logical units) connected to the second bus are aborted (suspended or canceled) after DMA transfer is complete. This makes it possible to prevent situations such as one in which the logical unit connected to the second bus hangs because the DMA transfer has ended incorrectly, thus ensuring that the command issued to the logical unit can be aborted in a suitable manner.

With any of the above data transfer control systems, the transfer controller may include a command comparison section which compares a content of a first command packet and a content of a second command packet when the bus reset occurs while the first command packet is being processed, the first command packet being transferred through the first bus before the bus reset occurs, the second command packet being transferred through the first bus after the bus reset occurs, and the first command packet and the second command packet being issued to the same one logical unit among the plurality of logical units, and the command abort section may abort a command that has been issued to the logical unit connected to the second bus based on the first command packet after a completion of the DMA transfer that has started based on the first command packet, when it is determined that the content of the second command packet differ from the content of the first command packet.

Note that if it has been determined that the contents of the first command packet and the contents of the second command packet for the same logical unit are the same, data transfer can restart from a continuation of the data transfer at the point at which the bus reset occurred.

With any of the above data transfer control systems, the command abort section may control a transfer of dummy data to or from the logical unit connected to the second bus, until the DMA transfer is complete.

The dummy data transfer control in this case could be implemented by dummy updates of pointers of a data buffer in which the transfer data is temporarily stored, or it could be implemented by providing hardware for dummy data transfer. Dummy data is data that is transferred through the second bus but is not transferred through the first bus, by way of example.

With any of the above data transfer control systems, the first bus may be a bus in which data transfer by the IEEE 1394 standard is performed, and the second bus may be a bus in which data transfer by the ATA/ATAPI standard is performed.

A further embodiment of the present invention provides an electronic instrument including:

any of the above data transfer control systems; and a plurality of logical units connected to a second bus.

A still further embodiment of the present invention provides a program for causing a data transfer control system to function as:

a command processing section which starts data transfer to or from a first logical unit connected to a second bus based on a command indicated by a command packet for the first logical unit when the command packet for the first logical unit is received from a device connected to a first bus, and starts data transfer to or from a second logical unit connected to the second bus based on a command indicated by a command packet for the second logical unit when the command packet for the second logical unit is received from the device connected to the first bus; and a wait processing section which waits processing of the command packet for the second logical unit that has been received, when a bus reset occurs during the processing of the command packet for the first logical unit and a command packet that is received after the bus reset occurs is the command packet for the second logical unit.

An even further embodiment of the present invention provides a program for causing a data transfer control system to function as:

a command processing section which starts data transfer to or from a first logical unit connected to a second bus based on a command indicated by a command packet for the first logical unit when the command packet for the first logical unit is received from a device connected to a first bus, and starts data transfer to or from a second logical unit connected to the second bus based on a command indicated by a command packet for the second logical unit when the command packet for the second logical unit is received from the device connected to the first bus; and a wait processing section which waits processing of the command packet for the second logical unit that has been received, when the command packet for the second logical unit is received while the second bus is being used by the first logical unit.

A yet further embodiment of the present invention provides a data transfer control method for transferring data through a bus, the method including:

starting data transfer to or from a first logical unit connected to a second bus based on a command indicated by a command packet for the first logical unit when the command packet for the first logical unit is received from a device connected to a first bus;

starting data transfer to or from a second logical unit connected to the second bus based on a command indicated by a command packet for the second logical unit when the command packet for the second logical unit is received from the device connected to the first bus; and waiting processing of the command packet for the second logical unit that has been received, when a bus reset occurs during the processing of the command packet for the first logical unit and a command packet that is received after the bus reset occurs is the command packet for the second logical unit.

An even further embodiment of the present invention provides a data transfer control method for transferring data through a bus, the method including:

starting data transfer to or from a first logical unit connected to a second bus based on a command indicated by a command packet for the first logical unit when the command packet for the first logical unit is received from a device connected to a first bus;

starting data transfer to or from a second logical unit connected to the second bus based on a command indicated by a command packet for the second logical unit when the command packet for the second logical unit is received from the device connected to the first bus; and waiting processing of the command packet for the second logical unit that has been received, when the command packet for the second logical unit is received while the second bus is being used by the first logical unit.

Embodiments of the present invention will be described in detail below.

Note that the embodiments described hereunder do not in any way limit the scope of the invention defined by the claims laid out herein. Note also that all of the elements of these embodiments should not be taken as essential requirements to the means of the present invention.

1. IEEE 1394 and SBP-2

1.1 SBP-2

The protocol for IEEE 1394 (such as IEEE 1394-1995, P1394a, and P1394b) is configured of a transaction layer, a link layer, and a physical layer. A protocol called the Serial Bus Protocol-2 (SBP-2) has been proposed as an upper-level protocol including some of the functions of the transaction layer under IEEE 1394 (broadly speaking: a first interface standard). This SBP-2 (SBP) has been proposed in order to enable the use of the SCSI command set on the IEEE 1394 protocol. In addition to minimizing changes to the command set used in electronic instruments that conform to the existing SCSI standards, use of this SBP-2 ensures that electronic instruments that conform to IEEE 1394 can also be used. This therefore enables a simplification of the design and development of electronic instruments.

A flowchart of the processing of the SBP-2 (broadly speaking: an upper-level first protocol for a first interface standard) is shown in FIG. 1. With SBP-2, read processing for confirming the connected devices is done first (step T1). The initiator (such as a personal computer) performs log-in processing to acquire the access right (bus usage right) for the target (a logical unit) (step T2). More specifically, log-in is performed by using a log-in operation request block (ORB) created by the initiator. The fetch agent is then initialized (step T3). A command block ORB (a command packet) is then used to perform command processing (step T4), and finally a log-out ORB is used for log-out processing (step T5).

Figure 2:
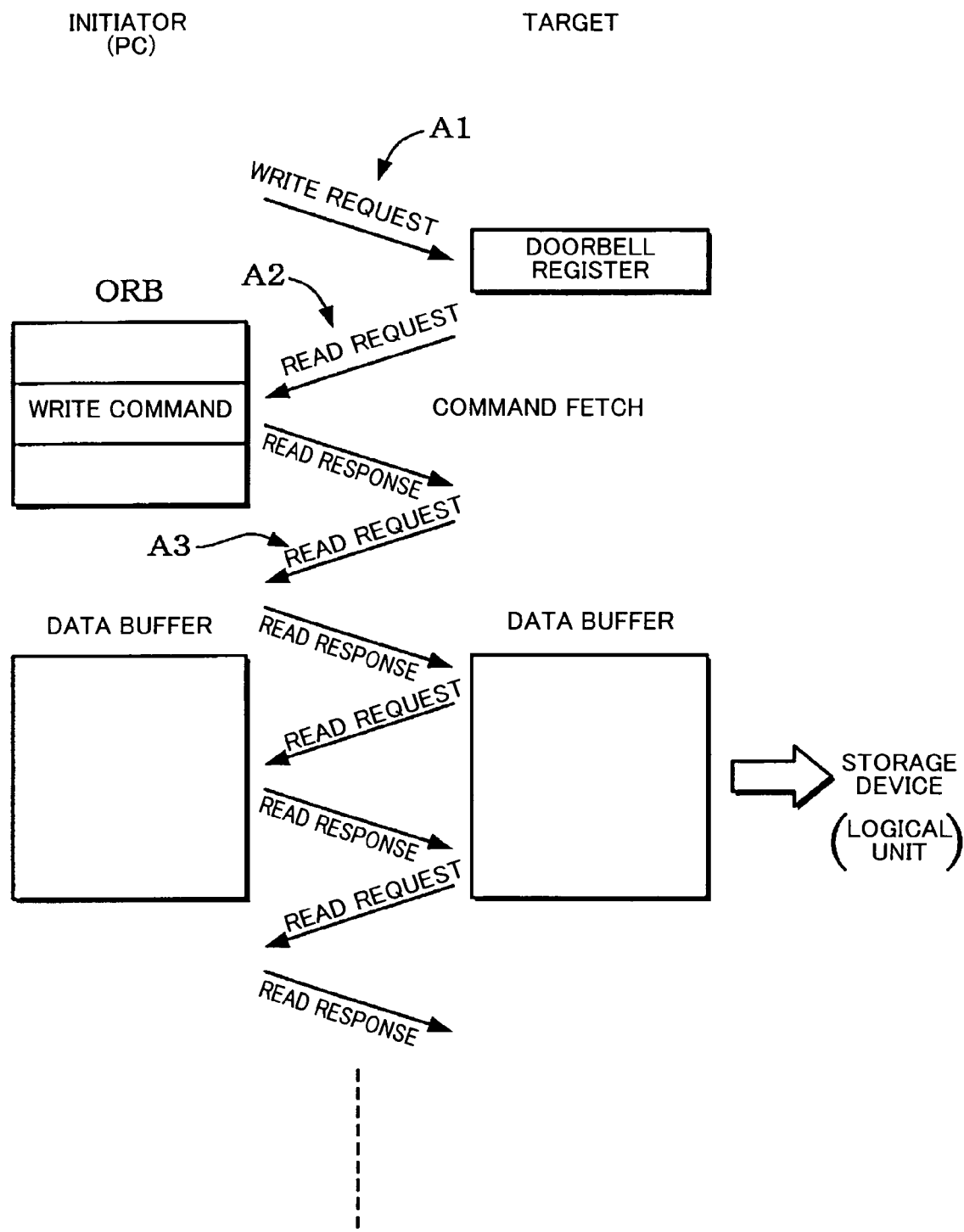
FIG. 2 is illustrative of SBP-2 data transfer using an ORB including a write command.

During the processing of step T4 in FIG. 1, the initiator transmits a write request packet (issues a write request transaction) and rings the target doorbell register, as shown at A1 in FIG. 2. When that happens, the target transmits a read request packet and the initiator returns the corresponding read response packet, as shown at A2. This causes the fetching of the ORB (command block ORB) created by the initiator into the data buffer of the target, and the target analyzes the command included within the thus-fetched ORB.

If the command included within the ORB is a SCSI write command, the target transmits the read request packet to the initiator and the initiator returns the corresponding read response packet, as shown at A3. This causes the transfer of data that was stored in the data buffer of the initiator to the target. If the logical unit of the target is a storage device, the thus-transferred data is written to the storage device.

Figure 3:
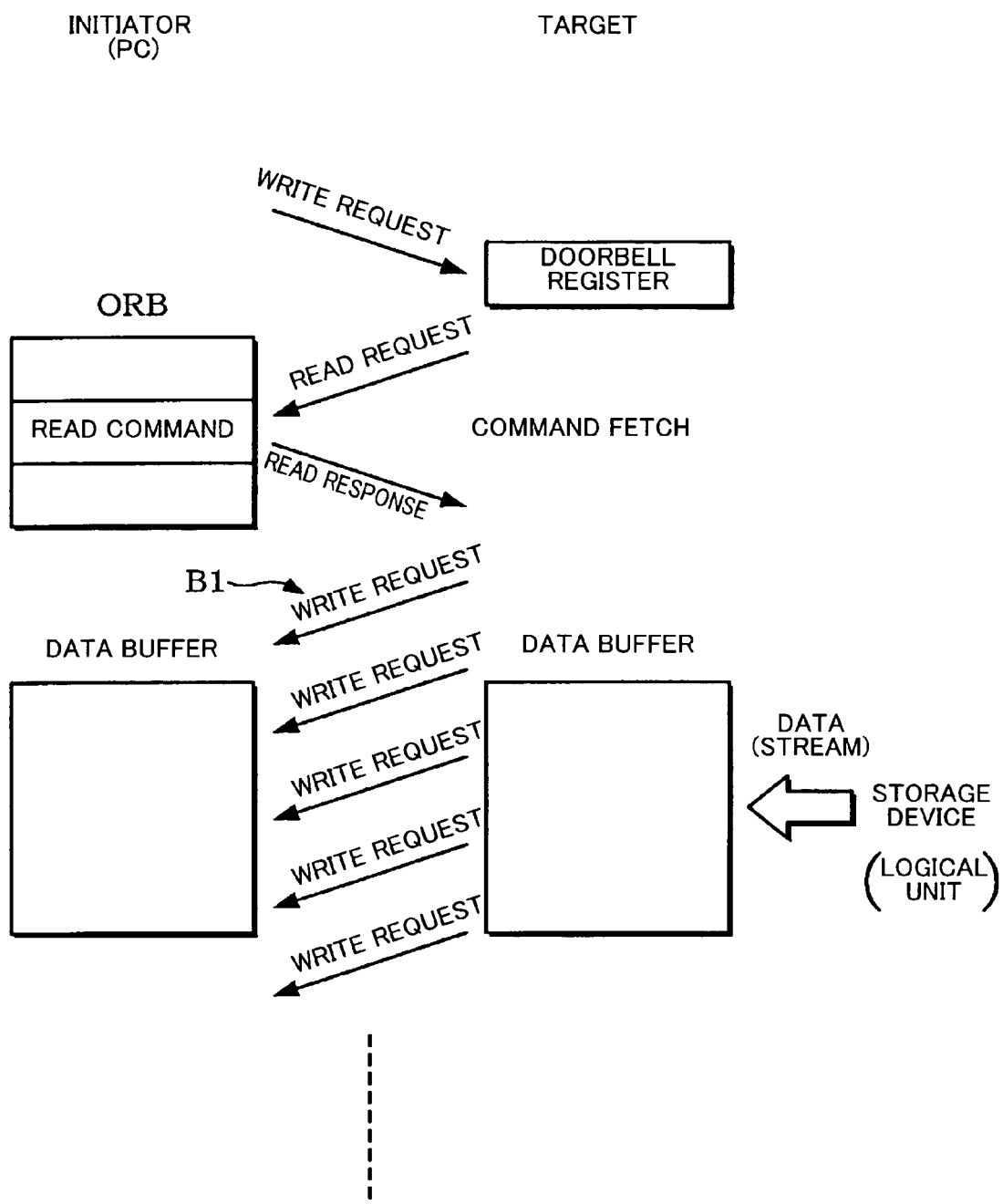
FIG. 3 is illustrative of SBP-2 data transfer using an ORB including a read command.

If the command included within the ORB is a SCSI read command, on the other hand, the target transmits a series of write request packets to the initiator, as shown at B1 in FIG. 3. If the logical unit of the target is a storage device, this causes the transfer of data that has been read out from the storage device, to the data buffer of the initiator.

This SBP-2 makes it possible for the target to transfer a request packet (issue a transaction) whenever it finds it convenient, to transfer data. Since it is therefore not necessary for the initiator and target to be synchronized, it enables an increase in data transfer efficiency.

Figure 4A:
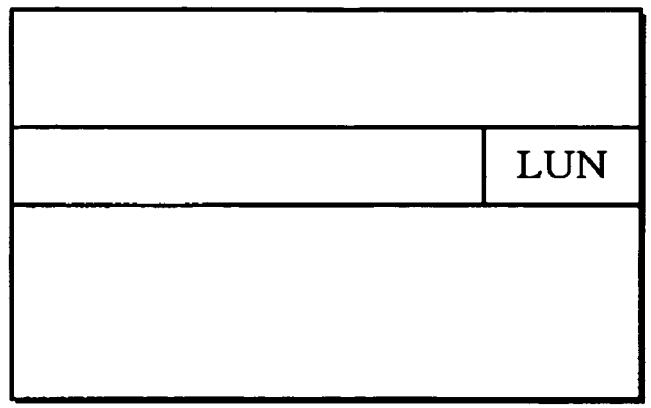
FIGS. 4A, 4B, and 4C are illustrative of a log-in ORB and a log-in response packet, etc.
Figure 4B:
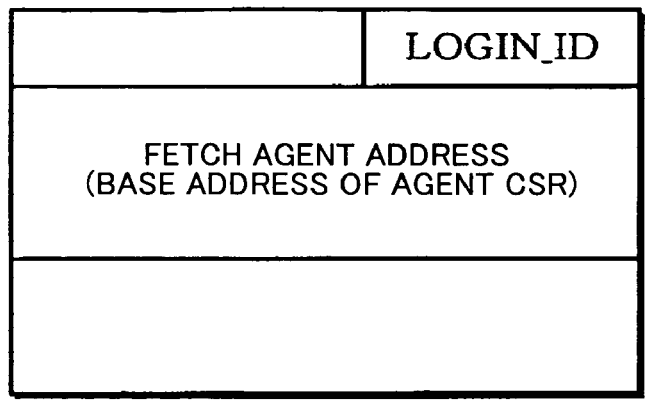
Figure 4C:
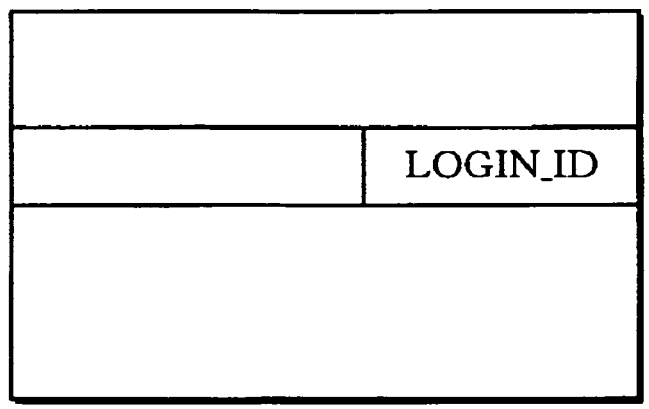

Note that the log-in process of step T2 of FIG. 1 is implemented by receiving the log-in ORB of FIG. 4A from the initiator and returning the log-in response packet of FIG. 4B to the initiator by the target. It could happen that the target has a plurality of logical units (hard disk drive and CD-R drive), by way of example. In such a case, the initiator creates a log-in ORB in which is written the logical unit number LUN that is required to log in, as shown in FIG. 4A. When that happens, the target writes the log-in identification number LOGIN_ID of that logical unit and the address (base address of the agent CSR) of the fetch agent (command block agent) into a log-in response packet and returns it to the initiator. If there is a reconnection request to a certain logical unit after a bus reset has occurred, for example, the initiator generates a reconnect ORB in which the log-in identification number LOGIN_ID is written, as shown in FIG. 4C. When the initiator uses a command block ORB to perform data transfer to or from a logical unit, it accesses the address of the fetch agent (command block agent) corresponding to that logical unit (see FIG. 4B). This enables the target to recognize that the command block ORB from the initiator is an ORB for which one of the plurality of logical units.

1.2 Bus Reset

Under the IEEE 1394, a bus reset occurs when power is turned on or when devices have been disconnected or connected while power is on. In other words, each node monitors voltage changes at the corresponding port. If a voltage change occurs at a port because of the connection of a new node to the bus, for example, a node that has detected that change informs the other nodes on the bus that a bus reset has occurred. The physical layer of each node informs the corresponding link layer that a bus reset has occurred.

When a bus reset occurs, topology information such as node IDs is cleared and the topology information is then automatically reset. In other words, tree identification and self identification are performed after a bus reset. The nodes that are to act as management nodes, such as the isochronous resource manager, cycle master, and bus manager, are then determined, and ordinary packet transfer restarts. Since the topology information is automatically reset after a bus reset under this IEEE 1394, it is possible to implement a hot-plug configuration in which the cables of electronic equipment can be freely removed or inserted.

It could happen that the targets of an SBP-2 data transfer are a plurality of logical units, such as a hard disk drive and a CD-R drive. Since the log-in processing at step T2 of FIG. 1 is performed for each logical unit in such a case, a state occurs in which a plurality of log-ins coexist.

If an event such as a device connection or disconnection causes a bus reset to occur, the initiator generates the reconnect ORB shown in FIG. 4C, which ensures that the previous log-in state continues, to perform a reconnection request. If a plurality of log-ins corresponding to a plurality of logical units coexist, a plurality of reconnection requests will come in for the target from the initiator.

Assume that the target has logical units LUN1 and LUN2 and a bus reset occurs partway through data transfer between the initiator and the logical unit LUN1, by way of example. In such a case, it often happens that the application program of the initiator (personal computer) that performs data transfer with the logical unit LUN1 is different from the application program of the initiator that performs data transfer with the logical unit LUN2. The reconnection request corresponding to the logical unit LUN1 that was the one performing data transfer before the bus reset is therefore not limited to the first one to arrive after the bus reset.

If data transfer to or from the logical unit LUN2 has priority after a bus reset, instead of the logical unit LUN1, there is a possibility that the data transfer to or from the LUN1 is interrupted partway, which would be inconvenient. If the logical unit LUN1 is a CD-R drive, by way of example, it is clear that a reset will be issued with respect to the CD-R drive because of the command interruption, leading to problems such as the occurrence of a CD-R write error.

2. Overall Configuration

Figure 5:
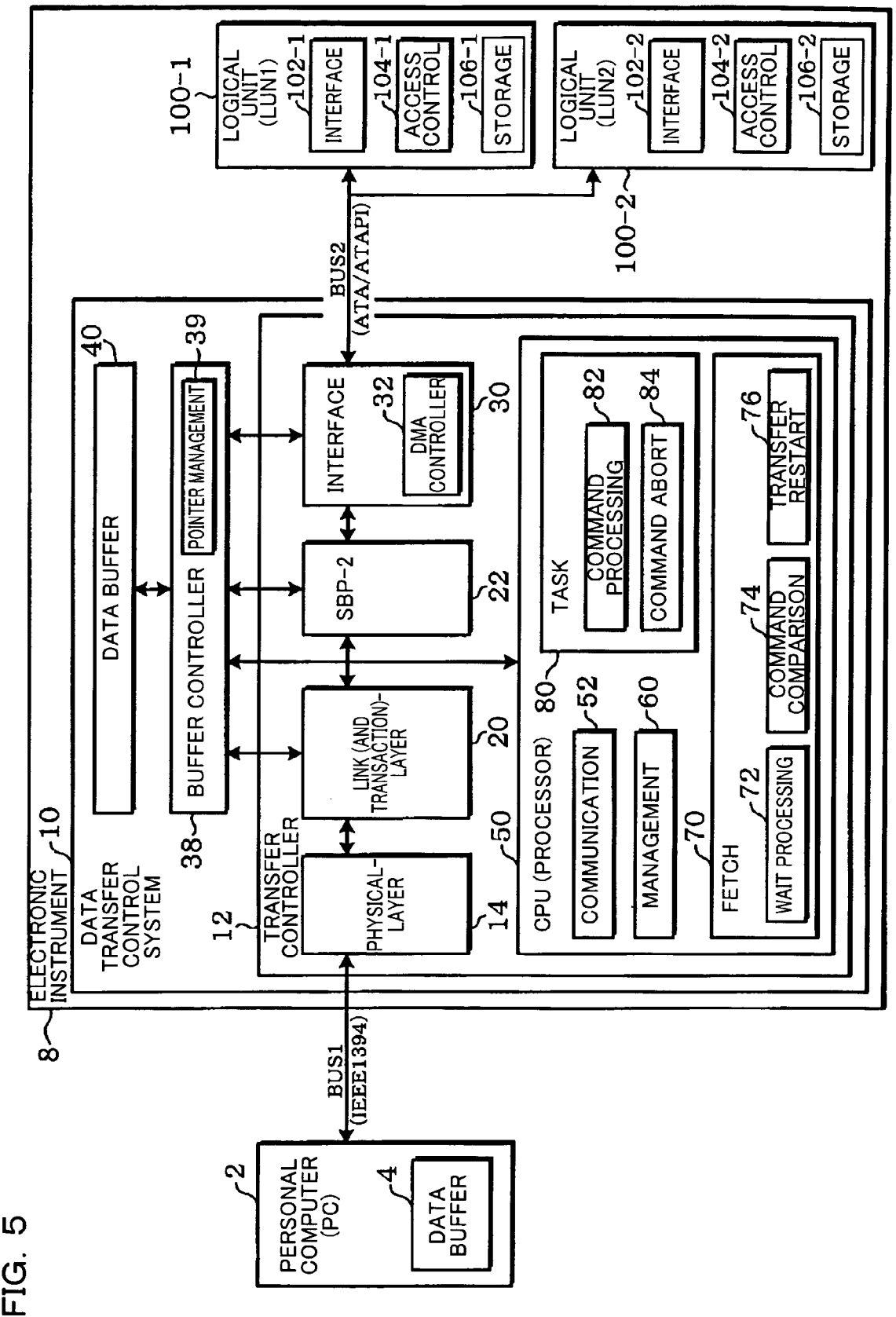
FIG. 5 shows an example of the configuration of a data transfer control system and electronic instrument in accordance with an embodiment of the present invention.

An example of the overall configuration of the data transfer control system that makes it possible to solve the above problems, and an electronic instrument that incorporates it, is shown in FIG. 5. Note that in the description below, the logical unit of the target is exemplified as a storage device (a hard disk drive or an optical disk drive such as a CD-R, CD-RW, DVD, DVD-R, or DVD-RAM), but the present invention is not limited thereto.

A personal computer (hereinafter abbreviated to PC) 2 having a data buffer 4 is connected to an electronic instrument 8 by a BUS1 (a first bus, a serial bus) conforming to IEEE 1394. The electronic instrument 8 has a data transfer control system 10 and logical units 100-1 and 100-2 (hereinafter abbreviated to LUN1 and LUN2 for convenience). Note that FIG. 5 shows a case in which there are two logical units (master and slave), but there could equally well be three or more logical units. The electronic instrument 8 could also include components such as a system CPU, system memory (ROM, RAM), an operating section, or signal processing device (not shown in the figure).

The data transfer control system 10 includes a transfer controller 12, a buffer controller 38, and the data buffer 40. Note that some of these components could be omitted from the configuration.

The transfer controller 12 controls the transfer of data between a PC (broadly speaking, a device) connected to the BUS1 (the first bus) and the plurality of the logical units LUN1 and LUN2 connected to a BUS2 (the second bus).

The buffer controller 38 controls access (write access and read access) to the data buffer 40 that temporarily stores transfer data. The buffer controller 38 includes a pointer management section 39. This pointer management section 39 manages pointers of the data buffer 40 by a ring buffer method, and updates a plurality of pointers for writing and reading. The buffer controller 38 can also include components such as a register for the control of the buffer controller 38, an arbitration circuit that arbitrates connections of the data buffer 40 to the bus, and a sequencer that generates various control signals.

The data buffer 40 (packet buffer) is a buffer (memory) for storing transfer data (packets) temporarily, and it is configured of hardware such as SRAM, SDRAM, or DRAM. Note that in this embodiment, the data buffer 40 functions as a packet storage section that can be randomly accessed. The data buffer 40 could also be connected externally instead of being incorporated into the data transfer control system 10.

The transfer controller 12 includes a physical-layer (PHY) circuit 14, a link-layer (and transaction) circuit 20, an SBP-2 circuit 22, an interface circuit 30, and a CPU 50 (broadly speaking: a processor). Note that the transfer controller 12 need not necessarily have all of the circuit blocks shown in FIG. 5; some of them could be omitted.

The physical-layer circuit 14 is designed to implement the physical-layer protocol in hardware, and it has the function of converting the logical symbols used by the link-layer circuit 20 into electrical signals. The link-layer circuit 20 is designed to implement the link-layer protocol and part of the transaction-layer protocol in hardware, and it provides various services for packet transfer between nodes. These functions of the physical-layer circuit 14 and the link-layer circuit 20 make it possible to perform data transfer that conforms to IEEE 1394 to and from a PC (the personal computer 2) over the BUS1 (the first bus).

The SBP-2 circuit 22 (broadly speaking: a transfer execution circuit) is designed to implement part of the SBP-2 protocol and part of the transaction layer in hardware. These functions of the SBP-2 circuit 22 make it possible to divide transfer data into a series of packets and transfer the thus-divided series of packets continuously.

The interface circuit 30 is designed to provide an interface with the logical units LUN1 and LUN2. This function of the interface circuit 30 makes it possible to perform data transfer that conforms to ATA (AT attachment) or ATAPI (ATA packet interface) to and from the logical units LUN1 and LUN2 through the BUS2 (a second bus).

The provision of the physical-layer circuit 14, the link-layer circuit 20, and the interface circuit 30 makes it possible for the data transfer control system 10 to have a conversion bridge function for IEEE 1394 (broadly speaking: a first interface standard) and ATA (IDE)/ATAPI (broadly speaking: a second interface standard).

A DMA controller 32 included by the interface circuit 30 enables direct memory access (DMA) transfer to and from the logical units LUN1 and LUN2 through the BUS2. Note that the logical units LUN1 and LUN2 connected to the BUS2 includes interface circuits 102-1 and 102-2 that perform data transfer conforming to ATA (IDE)/ATAPI, access control circuits 104-1 and 104-2 that control access (write or read access control) to storages 106-1 and 106-2, and the storages 106-1 and 106-2 such as hard disks or optical disks.

The CPU 50 (broadly speaking: a processor) controls data transfer and also controls the entire device. The CPU 50 includes a communications section 52, a management section 60, a fetch section 70, and a task section 80. Note that some of these components could be omitted from the configuration. These components included by the CPU 50 can be implemented by a CPU hardware circuit and a program (firmware) running on the CPU, and this program (processing module) is stored in memory such non-volatile memory (EEPROM) that can be electrically overwritten. It should be noted that some or all of the components of the CPU 50 could be implemented by a dedicated hardware circuit (ASIC).

The communications section 52 performs interface processing between hardware circuits such as the physical-layer circuit 14 and the link-layer circuit 20. The management section 60 (management agent) manages tasks such as log-in, reconnection, log-out, and reset. If the initiator has requested log-in at a target, for example, this management section 60 first accepts this log-in request.

The fetch section 70 (fetch agent) is a processing module that receives operation request blocks (ORBs), issues statuses, and handles command processing requests to the task section 80. The fetch section 70 differs from the management section 60, which can only handle a single request, in that it also can handle an ORB link list that it itself has fetched in accordance with a request from the initiator. Note that the management section 60 and the fetch section 70 could be provided for each of the logical units LUN1 and LUN2 in a manner such that there are first and second management sections (first and second management agents) and first and second fetch sections (first and second fetch agents).

The fetch section 70 includes a wait processing section 72, a command comparison section 74, and a transfer restart section 76. Note that some of these components could be omitted from the configuration. In this case, the wait processing section 72 performs wait processing for the various processes relating to each ORB (broadly speaking: a command packet, or a command packet for a data transfer operation request; hereinafter the same), such as processing for issuing a command specified by the ORB, processing for starting data transfer based on that command, or processing for issuing a status for that data transfer.

More specifically, if a bus reset occurs during the processing (during command issue or data transfer) of an ORB for a first logical unit (one of LUN1 or LUN2), and the ORB received after the bus reset is an ORB for a second logical unit (the other of LUN1 and LUN2), the processing of the received command packet for the second logical unit is made to wait. This wait processing issues an error status with respect to the PC (broadly speaking: a device) connected to the BUS1, if the processing of the command packet for the second logical unit waits for a predetermined time (N seconds) and the wait state could not be canceled (the timer could not be canceled) even when the processing has waited for the predetermined time.

If the command packet that is received after the bus reset has occurred is a command packet for the first logical unit, on the other hand, the wait processing section 72 performs processing for restarting the data transfer to or from the first logical unit (processing such as indicating the restart of data transfer or aborting the command).

When a bus reset (a reset that clears the node topology information) has occurred during ORB processing, the command comparison section 74 compares the contents of an ORB1, which was transferred in through the BUS1 before the bus reset occurred, and the contents of an ORB2, which was transferred in through the BUS1 after the bus reset occurred.

If it has been determined that the contents of the ORB2 after the bus reset are the same as those of the ORB1 before the bus reset, the transfer restart section 76 performs processing to restart the data transfer from the point at which the bus reset occurred.

The task section 80 (storage task section) executes the command processing and DMA transfer processing included within the ORBs. This task section 80 includes a command processing section 82 and a command abort section 84.

The command processing section 82 performs various types of processing relating to the ORB that has been transferred in through the BUS1 (a first bus of a first interface standard such as IEEE 1394). Specifically, when an ORB (command packet) for the first logical unit (one of LUN1 or LUN2) is received from the PC (device) connected to the BUS1, data transfer starts to or from the first logical unit which is connected to the BUS2 (a second bus of a second interface standard such as ATA/ATAPI), based on the command (SCSI or SPC-2 command) indicated by the ORB. If an ORB for the second logical unit (the other of LUN1 and LUN2) is received, data transfer starts to or from the second logical unit which is connected to the BUS2, based on the command indicated by the ORB. More specifically, when an ORB is received from the PC, the command processing section 82 issues the command included in the ORB to the corresponding logical unit (LUN1 or LUN2) and starts DMA transfer (data transfer that does not go through the PC) over the BUS2.

The command abort section 84 aborts the command (such as a SCSI read command or write command) that was issued for the logical unit (LUN1 or LUN2) based on the ORB, after the DMA transfer (continuous data transfer) based on that ORB has been completed. More specifically, if it is determined that the contents of the ORB1 from before the bus reset are different from those of the ORB2 for the same logical unit after the bus reset, the command abort section 84 aborts (suspends or cancels) the command issued for that logical unit based on the ORB1, after the DMA transfer started based on that ORB1 (command) has been completed. In such a case, the command abort section 84 performs control to ensure that dummy data is transferred to or from the logical unit, until the DMA transfer started by the ORB ends.

The data transfer control system 10 of this embodiment, which has a bus conversion bridge function, usually transfers data that has come in through the BUS2 from a logical unit to the PC through the BUS1. It also transfers data that has come in from the PC through the BUS1 to the logical units through the BUS2. In contrast thereto, when dummy data is transferred, dummy data from the logical unit through the BUS2 is transferred to the data transfer control system 10 but that dummy data is not transferred to the PC. Similarly, data from the PC through the BUS1 is not transferred to the data transfer control system 10 but dummy data is transferred to the logical units through the BUS2.

3. Processing

Figure 6:
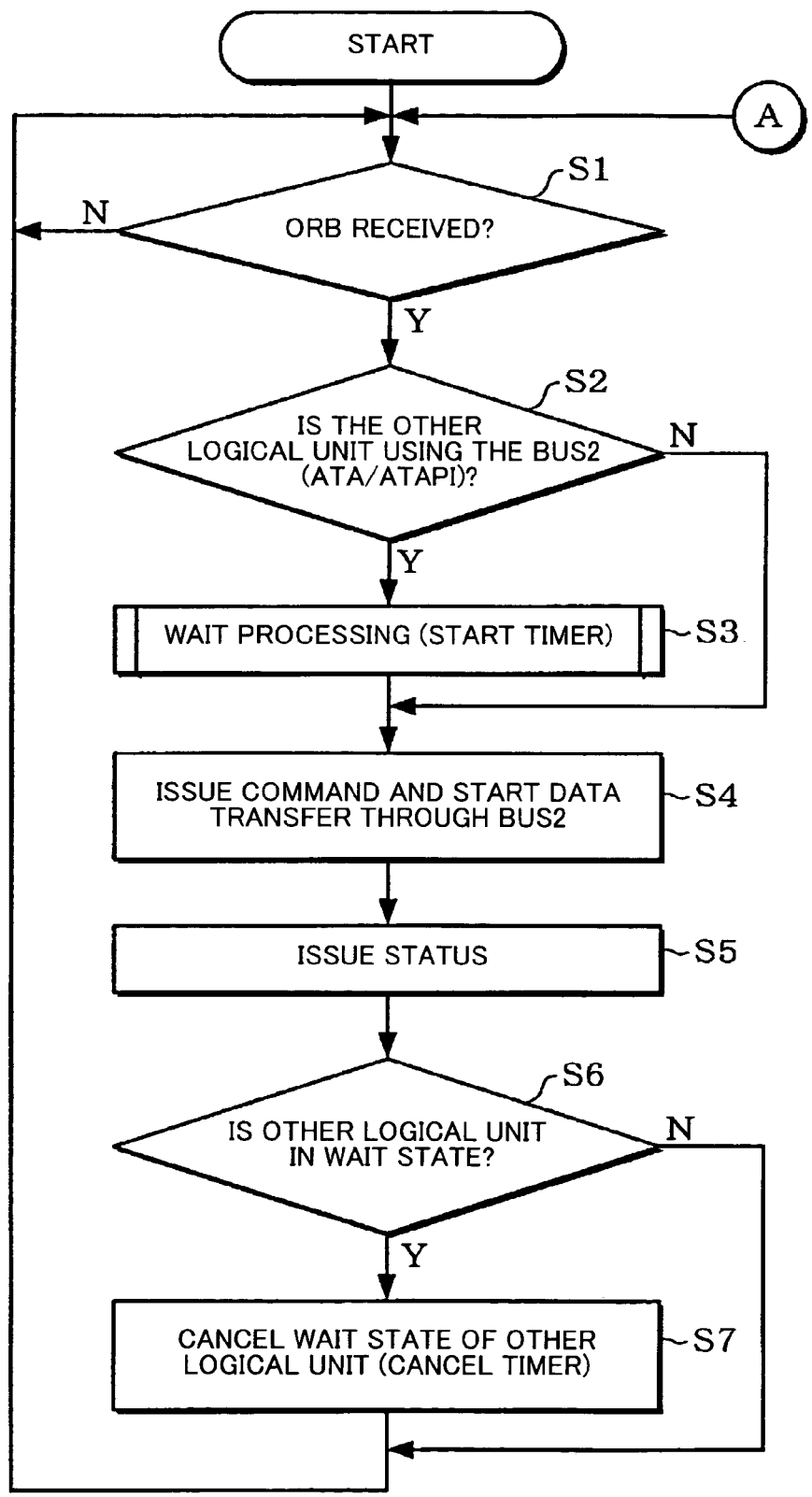
FIG. 6 is a flowchart of the processing of an embodiment of the present invention during normal operation.
Figure 7:
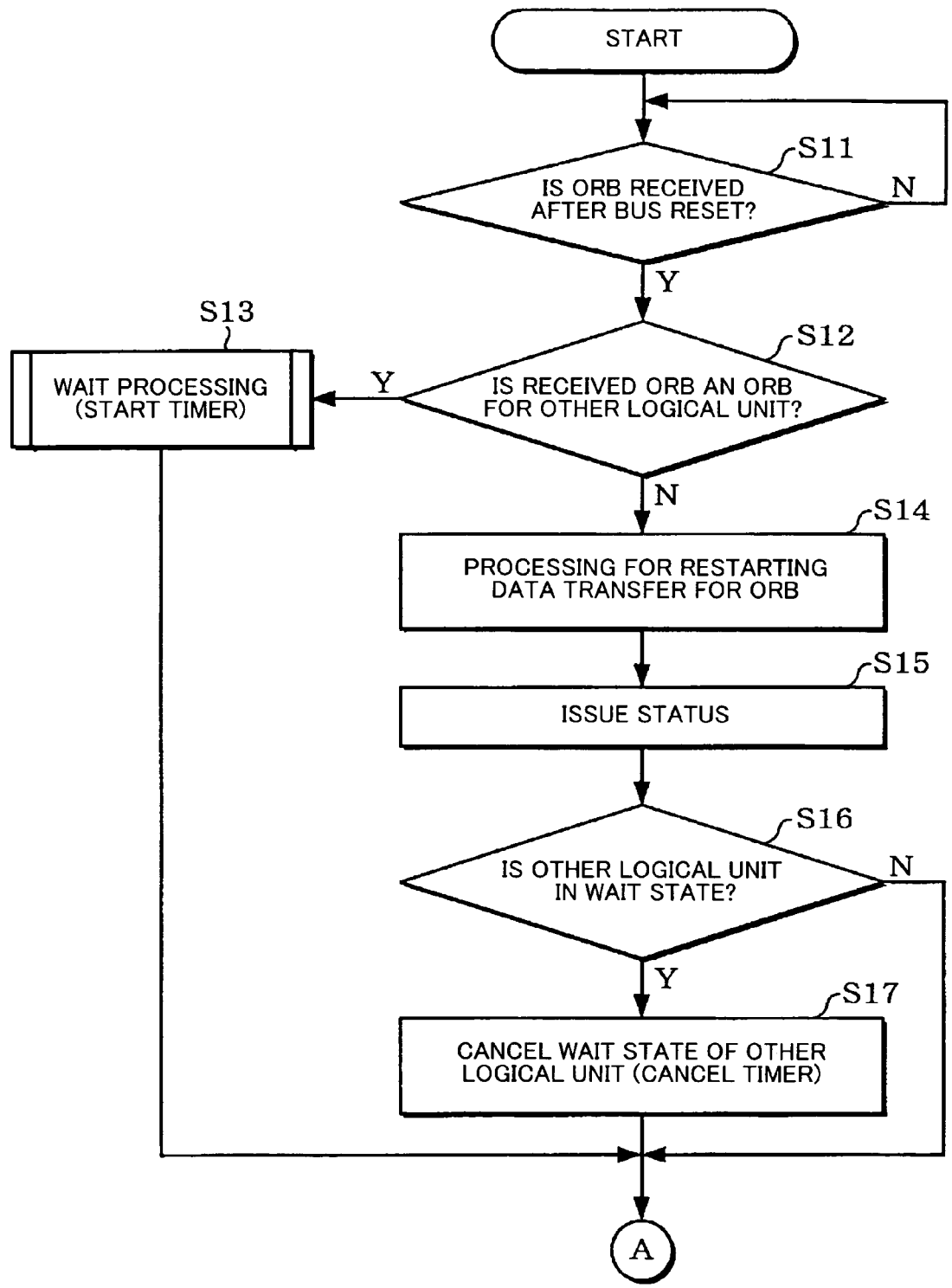
FIG. 7 is a flowchart of the processing of this embodiment when a bus reset occurs.
Figure 8:
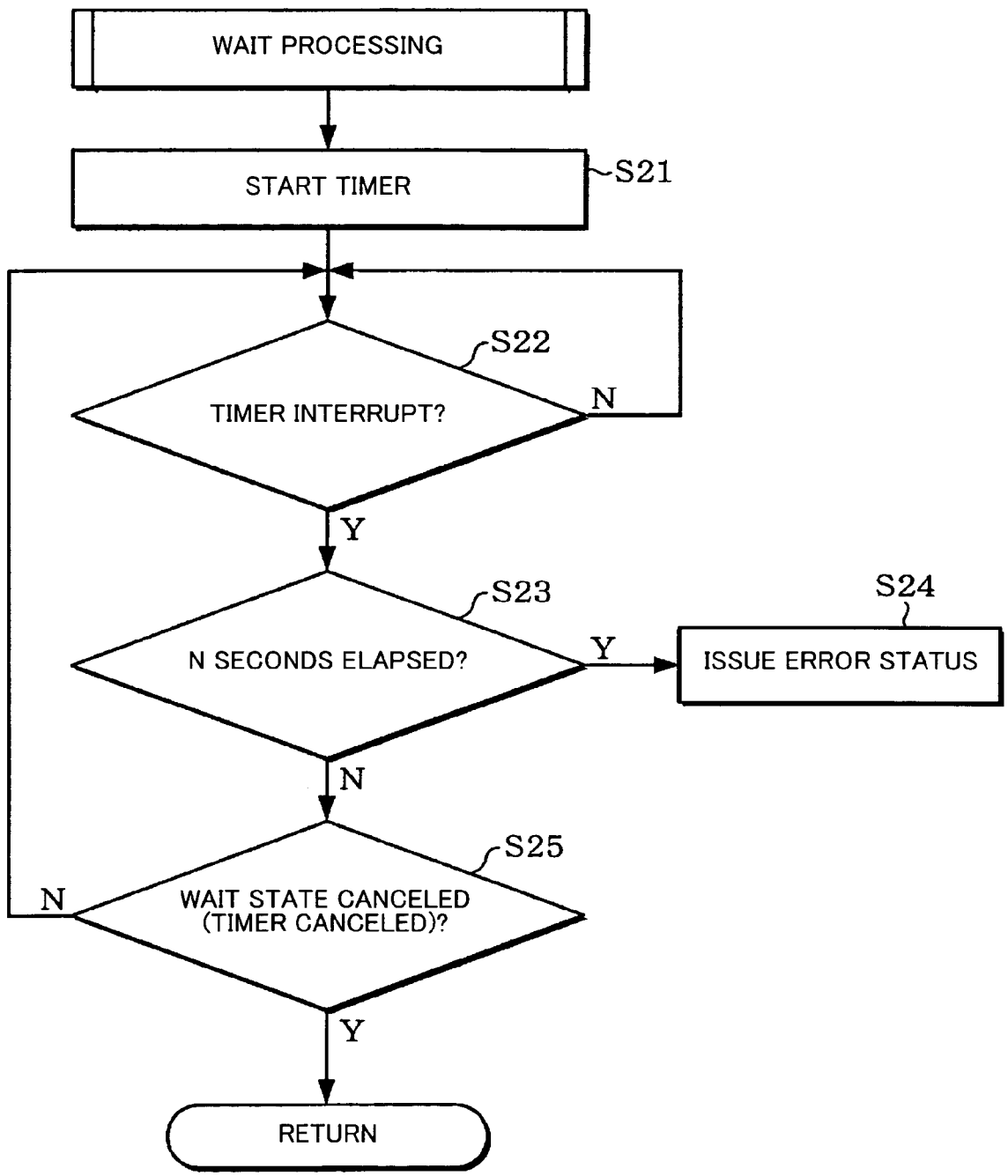
FIG. 8 is a flowchart of wait processing.

The description now turns to examples of the processing of the data transfer control system of this embodiment, using the flowcharts of FIGS. 6 to 8. FIG. 6 is a flowchart of the processing during normal operation in which a bus reset does not occur.

When an ORB is received from the PC (step S1), the other logical unit determines whether or not the BUS2 (ATA/ATAPI) is in use (step S2). If it is determined by the other logical unit that the BUS2 is in use, it starts a timer and makes the processing of the received ORB wait (step S3). If an ORB for the logical unit LUN2 is received while the logical unit LUN1 is using the BUS1 (during data transfer with the LUN1 over the BUS2), for example, the processing of the LUN2 ORB is made to wait. If there are first and second fetch sections (first and second fetch agents) for the LUN1 and LUN2 as the fetch section 70 and an ORB for the LUN2 is received while an ORB for the LUN1 is being processed by the first fetch section, by way of example, the processing by the second fetch section of the ORB for the LUN2 is made to wait.

The system then issues the command indicated by the ORB (such as a write command or read command) to the logical unit corresponding to that ORB, and data transfer (DMA transfer) starts through the BUS2 (step S4). When the data transfer is complete, the status (normal status) is issued to the PC (step S5).

The system then determines whether or not the other logical unit is in a wait state (step S6) and, if it is in the wait state, it cancels the timer to cancel the wait state of that other logical unit (step S7). Assume that an ORB for the LUN2 is received in steps S2 and S3 while the LUN1 is using the BUS1, by way of example, and the processing of the ORB for the LUN2 is made to wait. When that happens, the wait state of the processing of this ORB for the LUN2 is canceled in steps S6 and S7. This cancelation of the wait state is done by the first fetch section for the LUN1, by way of example, and this enables the second fetch section for the LUN2 to start the processing of the ORB for the LUN2.

FIG. 7 is a flowchart of the processing when a bus reset occurs (but it should be noted that this is limited to the case in which processing was executing before the bus reset; if no processing was executing before the bus reset, the flow is as shown in FIG. 6). If an ORB is received after the bus reset occurs (step S11), the system determines whether or not the received ORB is an ORB for the other logical unit (step S12). If it is an ORB for the other logical unit, the system starts the timer and makes the processing of the thus-received ORB wait (step S13). If a bus reset occurs while an ORB for the LUN1 is being processed and an ORB for the LUN2 is received after the bus reset occurs, by way of example, the processing of the ORB for the LUN2 is made to wait.

If the thus-received ORB is not for the other logical unit, processing for restarting the data transfer of that ORB (such as command comparison processing, data transfer restart processing, or command abort processing) is performed (step S14). Once the data transfer is complete, the status (normal status) is issued to the PC (step S115).

The system then determines whether or not the other logical unit is in the wait state and, if it is in the wait state, it cancels the timer, thus cancelling the wait state of that other logical unit (step S17). Assume that an ORB for the LUN2 is received in steps S12 and S13 after a bus reset occurs, and the processing of the ORB for the LUN2 is made to wait, by way of example. When that happens, the wait state of this processing of the ORB for the LUN2 is canceled in steps S16 and S17. This cancelation of the wait state could be performed by the first fetch section for the LUN1, by way of example, which makes it possible for the second fetch section for the LUN2 to start the processing of the ORB for the LUN2.

FIG. 8 is a flowchart of the wait processing of step S3 of FIG. 6 and step S13 of FIG. 7. First of all, the system starts the timer (step S21), and waits until a periodic interrupt comes in from the timer (step S22). If a timer installed in the CPU causes the start of timer processing, for example, an interrupt occurs periodically at a predetermined timing (such as every 50 ms). The data transfer control system 10 (the wait processing section 72) calculates elapsed time by counting these periodic interrupts. When it is determined that N seconds (such as 10 seconds), which is the predetermined based on the interrupts from the timer, have elapsed, the system determines that the processing for that ORB has timed out and issues an error status to the PC (step S24). If N seconds has not yet elapsed, on the other hand, the system determines whether or not the wait state has been canceled (step S7 of FIG. 6 or step S17 of FIG. 7) and, if it has not been canceled, it returns to the interrupt-wait state of step S22.

Assume that a bus reset occurred during the processing of an ORB for the LUN1 and an ORB for the LUN2 was received after the bus reset occurred, in steps S12 and S13 of FIG. 7. When that happens, the processing of the ORB for the LUN2 is made to wait for just the predetermined time (N seconds) by steps S22 and S23 of FIG. 8. If the wait state has not been canceled even after the processing has waited for just the predetermined time (step S25), an status is issued to the PC (step S24).

FIGS. 9A to 13C are schematically illustrative of the processing of this embodiment. FIGS. 9A to 11 are illustrative of the processing of this embodiment during normal operation in which no bus reset occurs.

Figure 9A:
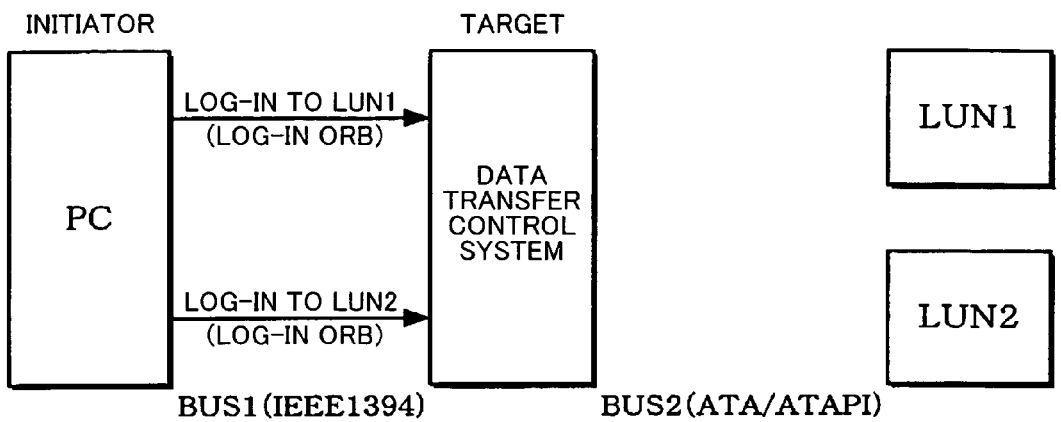
FIGS. 9A, 9B, and 9C are illustrative of the processing of this embodiment during normal operation.

As shown in FIG. 9A, the PC that is the initiator gives priority to data transfer and logs in to the logical units LUN1 and LUN2 of the target. This ensures that a plurality of log-ins coexist simultaneously, such as the log-ins to LUN1 and LUN2. These LUN1 and LUN2 log-ins are identified by the logical unit number LUN of the log-in ORBs of FIG. 4A.

Figure 9B:
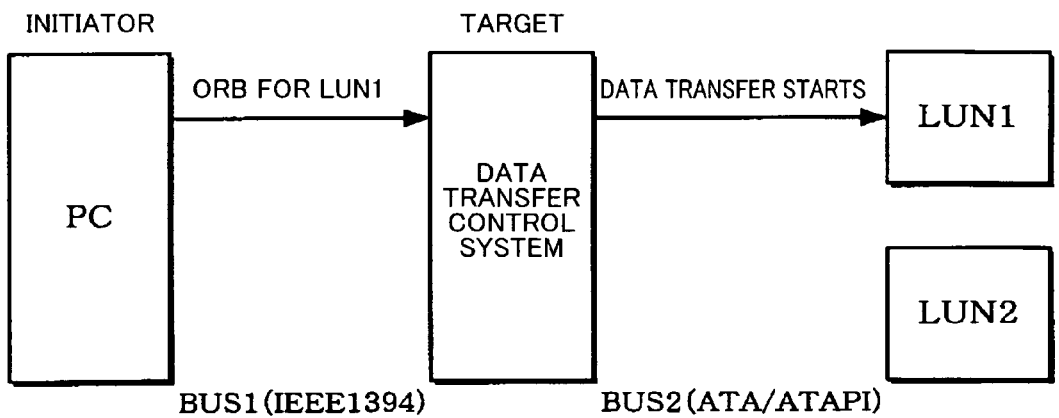
Figure 9C:
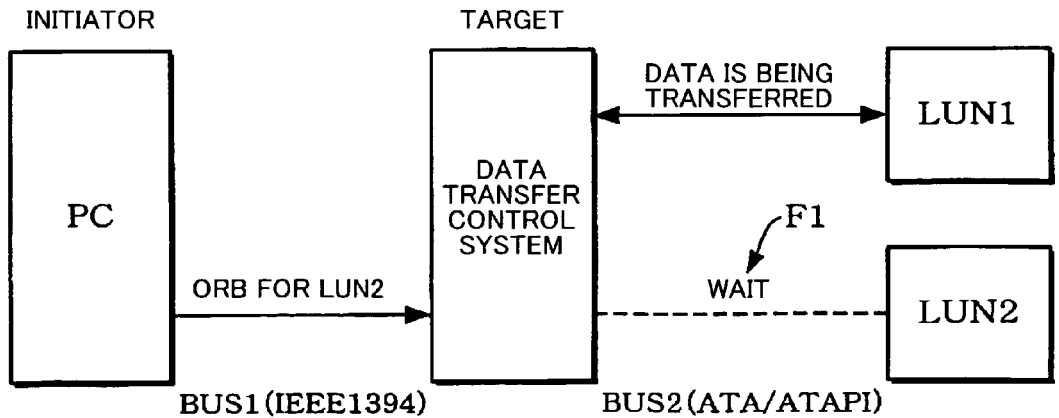

If the data transfer control system receives an ORB for the LUN1 (a command block ORB), it starts data transfer to or from the LUN1, as shown in FIG. 9B. If data is to be written to memory of the LUN1, for example, the PC that is the initiator creates an ORB including a write command and the data transfer control system (first fetch section) receives (fetches) that ORB from the PC (see A2 in FIG. 2). The data transfer control system then receives write data through the BUS1 from the data buffer of the PC (see A3 of FIG. 2). The data transfer control system issues the write command included in the ORB to the LUN1 and transmits (by DMA transfer) the write data that has been received from the PC to the LUN1 through the BUS2. The LUN1 writes the thus-received write data to memory.

If data is to be read from the memory of the LUN1, on the other hand, the PC creates an ORB including a read command and the data transfer control system receives that ORB from the PC. The data transfer control system issues the read command that is included in the ORB to the LUN1 and receives read data that has been read out from the LUN1 memory through the BUS2. The data transfer control system transmits the read data it has received from the LUN1 through the BUS1 to the PC (see B1 of FIG. 3).

A plurality of log-ins coexist in this embodiment, as shown in FIG. 9A. Thus it could happen that an ORB for the LUN2 (command block ORB) is received from the PC while the LUN1 is using the BUS1 (during data transfer). In such a case, this embodiment makes the processing of the ORB for the LUN2 wait, as shown at F1 of FIG. 9C of G1 of FIG. 11. This enables use of the BUS2 by both the LUN1 and LUN2.

Figure 10A:
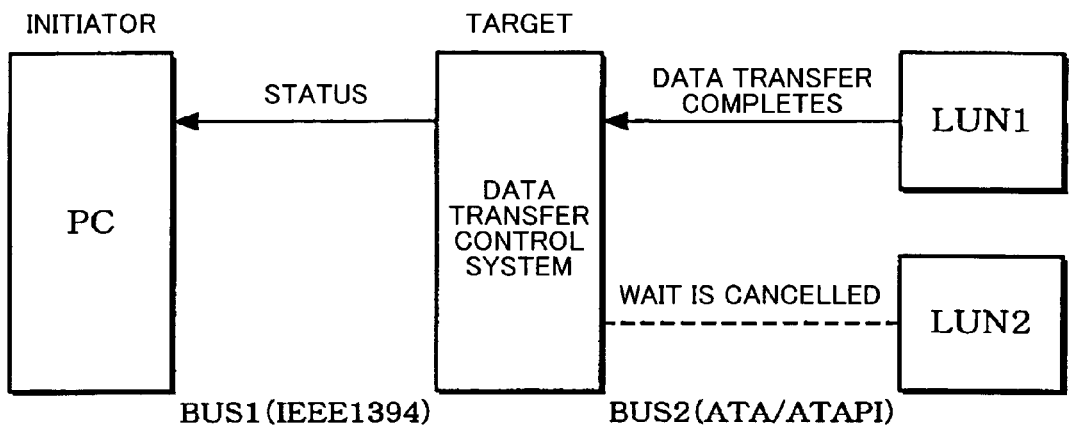
FIGS. 10A, 10B, and 10C are further illustrative of the processing of this embodiment during normal operation.
Figure 10B:
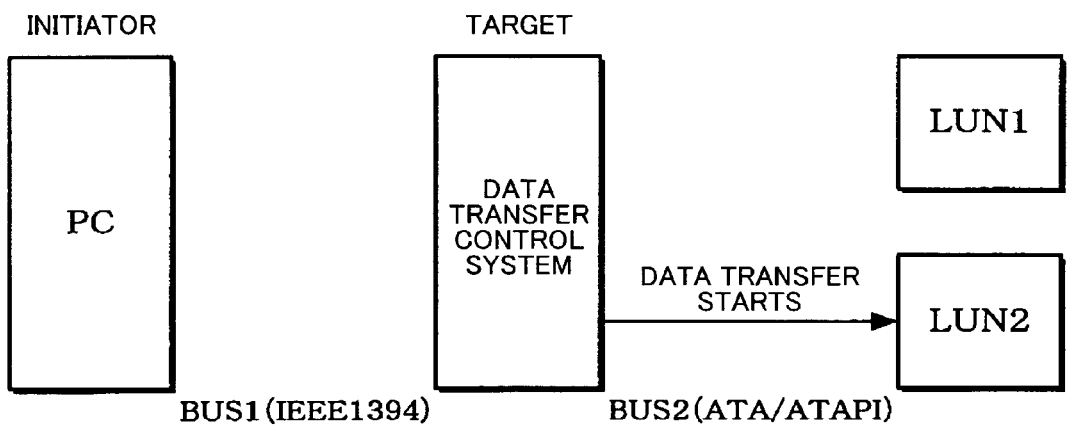
Figure 10C:
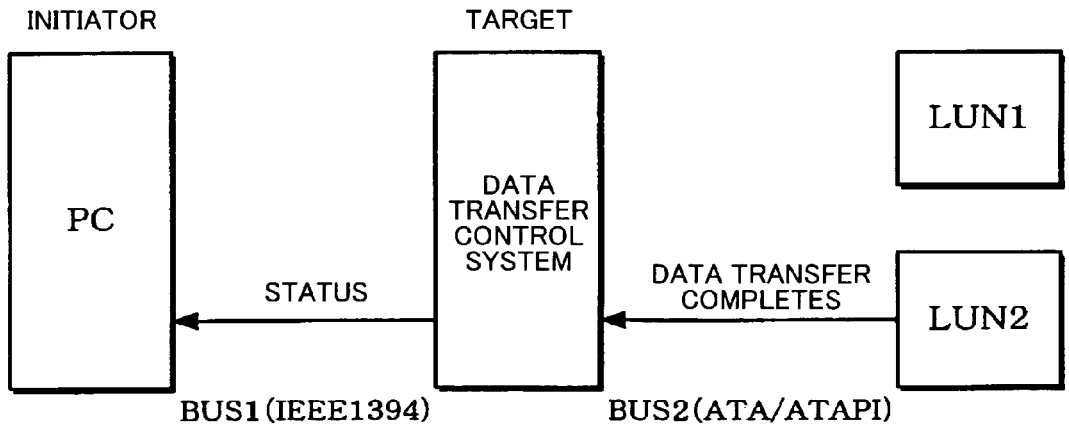
Figure 11:
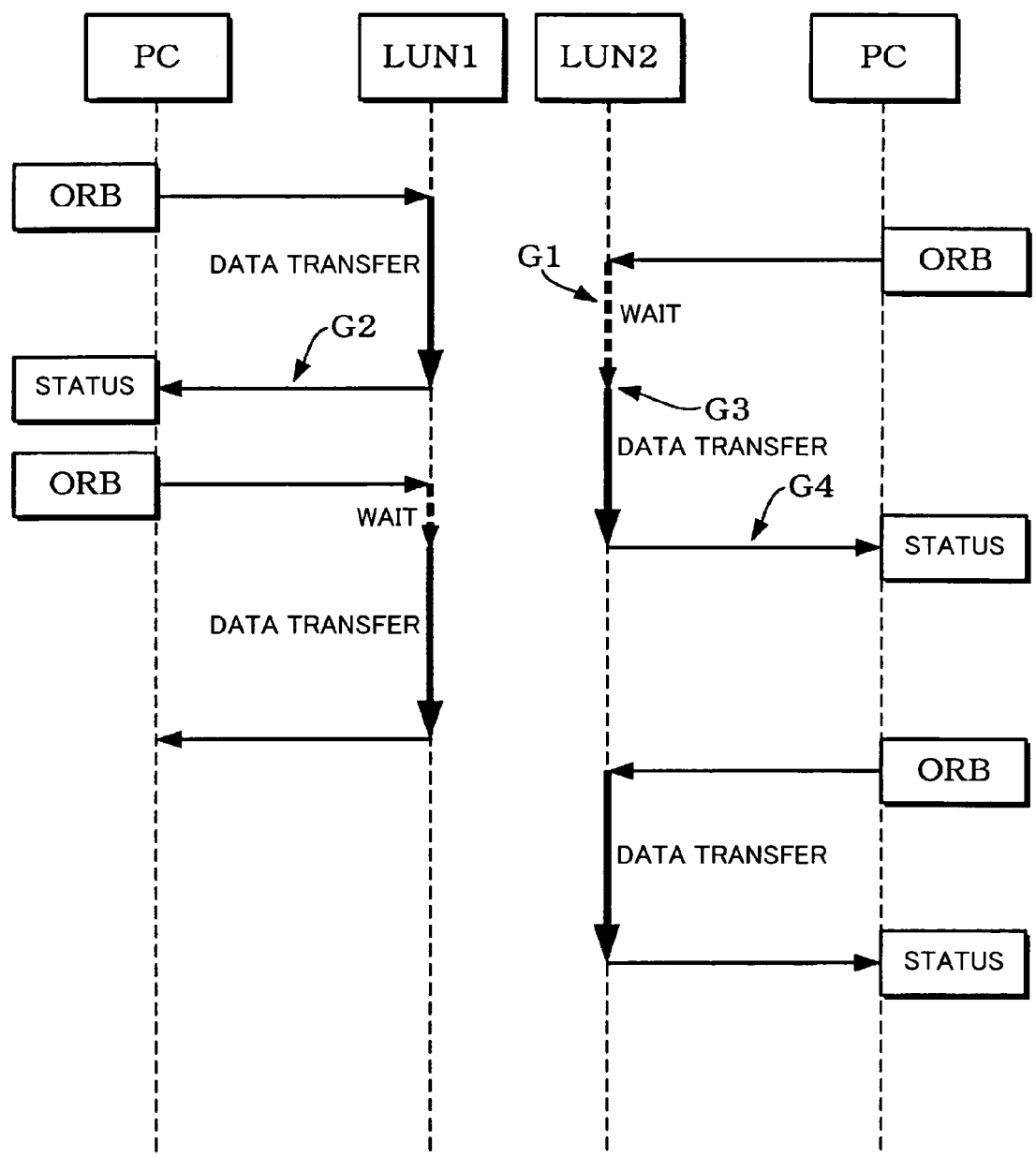
FIG. 11 is illustrative of the processing of this embodiment during normal operation.

When the data transfer control system completes the data transfer, the status (normal status) is issued to the PC, as shown in FIG. 10A and at G2 of FIG. 11. When this happens, the wait state of the LUN2 processing is canceled and the data transfer control system starts the data transfer to or from the LUN2, as shown in FIG. 10B and at G3 of FIG. 11. When the data transfer is complete, the status is issued to the PC, as shown in FIG. 10C and at G4 of FIG. 11. The above configuration implements suitable data transfer control between a PC and a plurality of logical units, even if the target has a plurality of logical units.

Figure 12A:
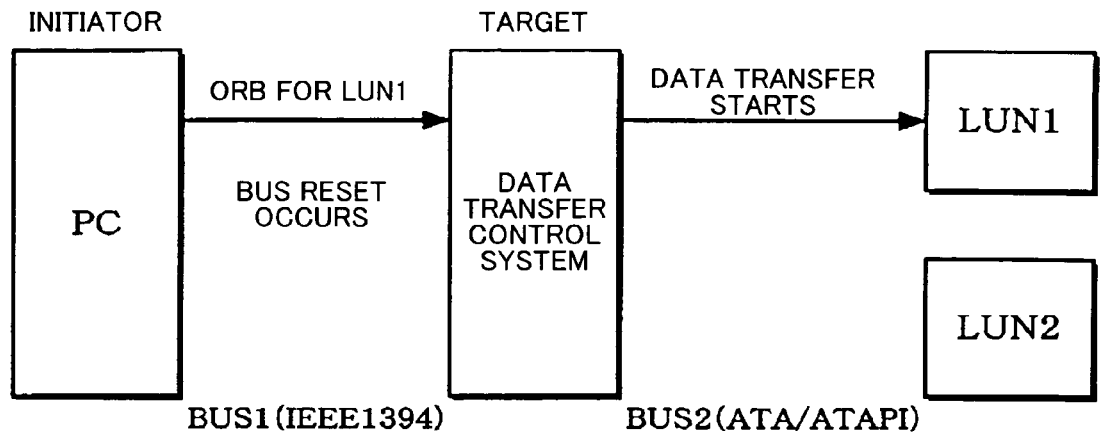
FIGS. 12A, 12B, and 12C are illustrative of the processing of this embodiment when a bus reset occurs.

FIGS. 12A to 13C are illustrative of the processing when a bus reset occurs. Assume that the data transfer control system receives an ORB for the LUN1 from the PC and a bus reset has occurred during the processing of the ORB for the LUN1 (during the data transfer), as shown in FIG. 12A. Since a plurality of log-ins coexist with this embodiment, as shown in FIG. 9A, the possibilities are not limited to an ORB for the LUN1 being received from the PC after a bus reset occurs; an ORB for the LUN2 could also be received first. If the processing for an ORB for the LUN2 were to start when that ORB is received, it would no longer be possible to maintain continuity of the data transfer set by the ORB for the LUN1, and thus it is possible that a data write error or the like would occur in the LUN1 memory (such as CD-R).

Figure 12B:
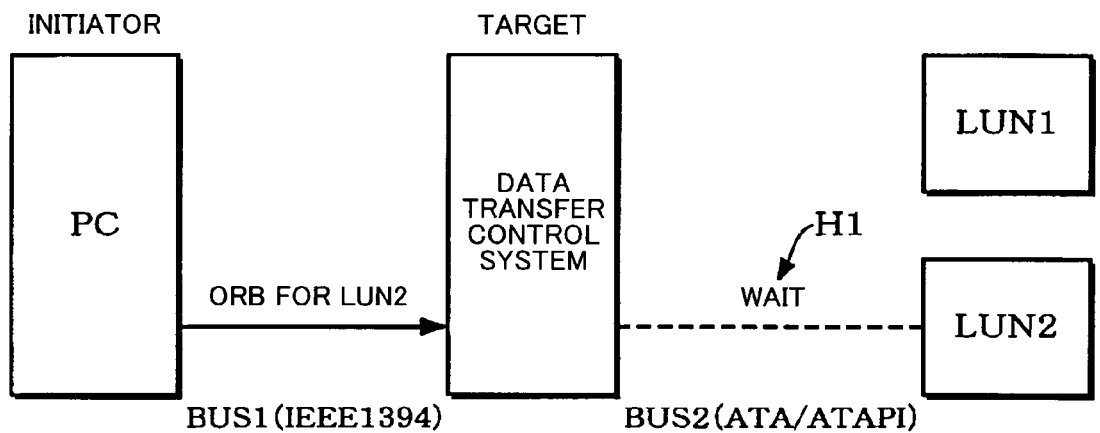
Figure 12C:
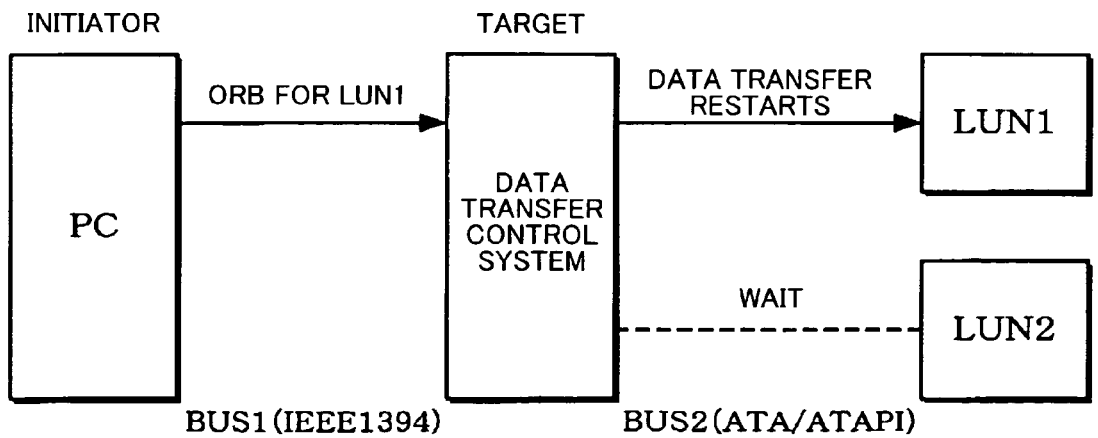

With this embodiment, if the data transfer control system has received an ORB for the LUN2 instead of an ORB for the LUN1 after the bus reset occurs, the processing of the ORB for the LUN2 is made to wait, as shown at H1 of FIG. 12B. If an ORB for the LUN1 is received from the PC, data transfer set by that ORB for the LUN1 restarts, as shown in FIG. 12C. In other words, data transfer restarts as a continuation of the data transfer at the time at which the bus reset occurred. This makes it possible to prevent data write errors to the LUN1 memory.

Figure 13A:
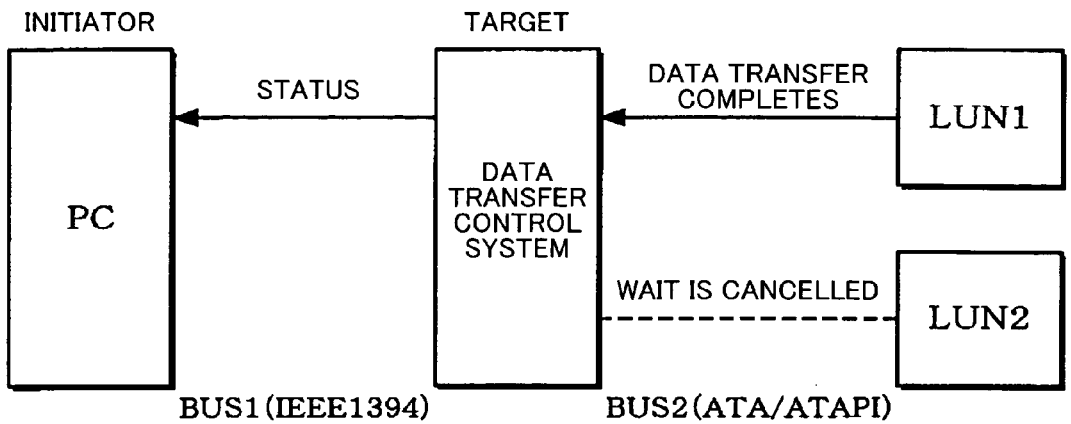
FIGS. 13A, 13B, and 13C are further illustrative of the processing of this embodiment when a bus reset occurs.
Figure 13B:
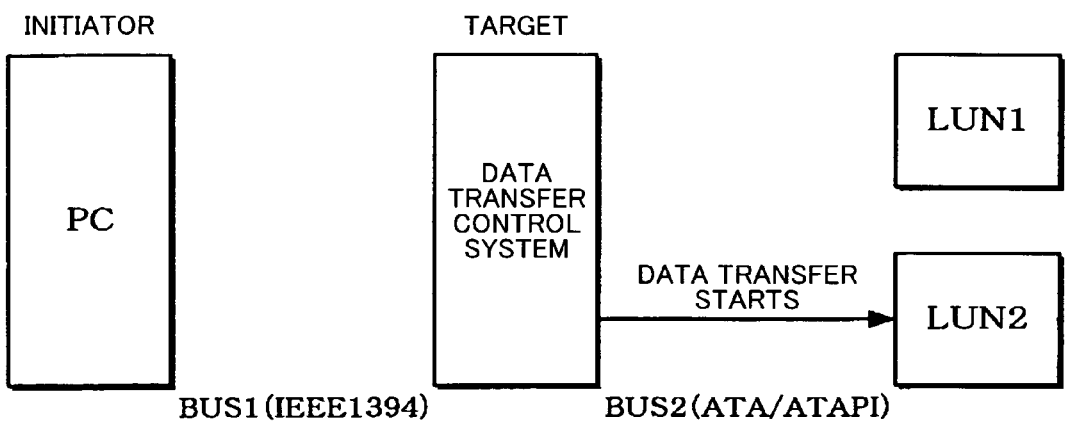
Figure 13C:
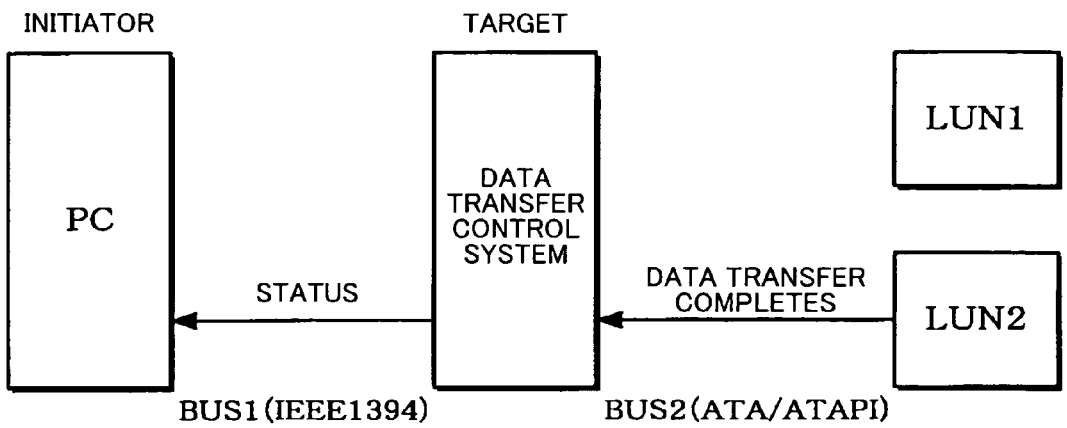

When the data transfer is completed, the data transfer control system issues the status to the PC, as shown in FIG. 13A. When that happens, the wait state of the LUN2 processing is canceled and the data transfer control system starts the data transfer to or from the LUN2, as shown in FIG. 13B. When the data transfer ends, as shown in FIG. 3C, the status is issued to the PC. The above configuration implements suitable data transfer control between a PC and a plurality of logical units, even if the target has a plurality of logical units.

Note that with SBP-2, a PC that is logged into a logical unit of the target before a bus reset has priority to enable a reconnection request with respect to that logical unit during the time until a reconnect time TR elapses. If the reconnect time TR elapses without the PC making a reconnection request, the reconnection times out and it is determined that the reconnection was unsuccessful. If the reconnection is unsuccessful in this manner, and an ORB4 for the other logical unit (LUN2) is a wait state after the bus reset occurs and also reconnection with respect to the logical unit (LUN1) that was being processed before the bus reset occurred is unsuccessful, this embodiment cancels the timer and thus cancels the wait state of the processing of the ORB4, without waiting for the wait time TW to elapse. Since this makes it possible to cancel the wait state without waiting a wasteful amount of time, it enables an increase in processing efficiency.

Figure 14A:
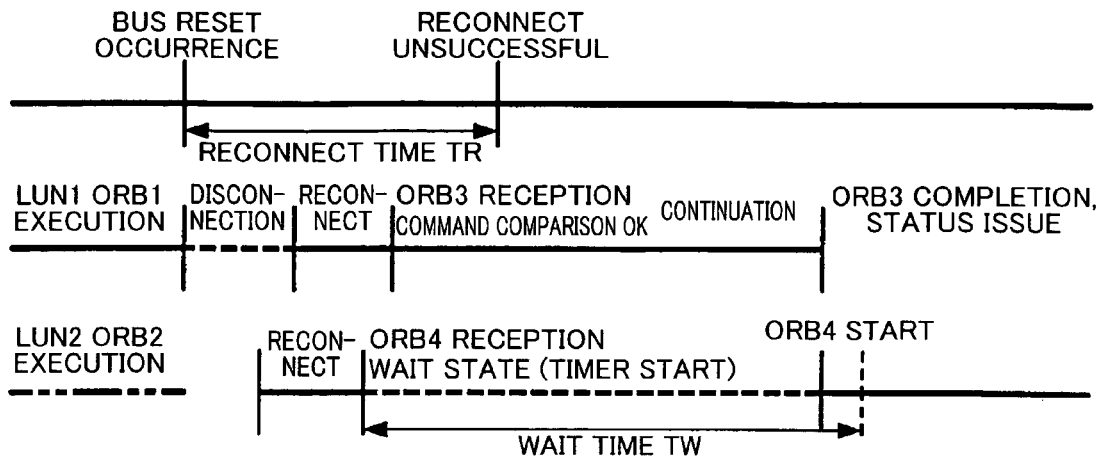
FIGS. 14A, 14B, and 14C are illustrative of the method of canceling the wait state at the point at which the reconnection is unsuccessful.

If a bus reset occurs during the processing of the ORB1 for the LUN1 and the ORB4 for the LUN2 is received after the bus reset occurs, as shown in FIG. 14A, this embodiment makes the processing of the ORB4 for the LUN2 wait just the wait time TW (at maximum). The PC reconnects to the LUN1 within the reconnect time TR and waits for the completion of the processing of the ORB3 for the LUN1.

Figure 14B:
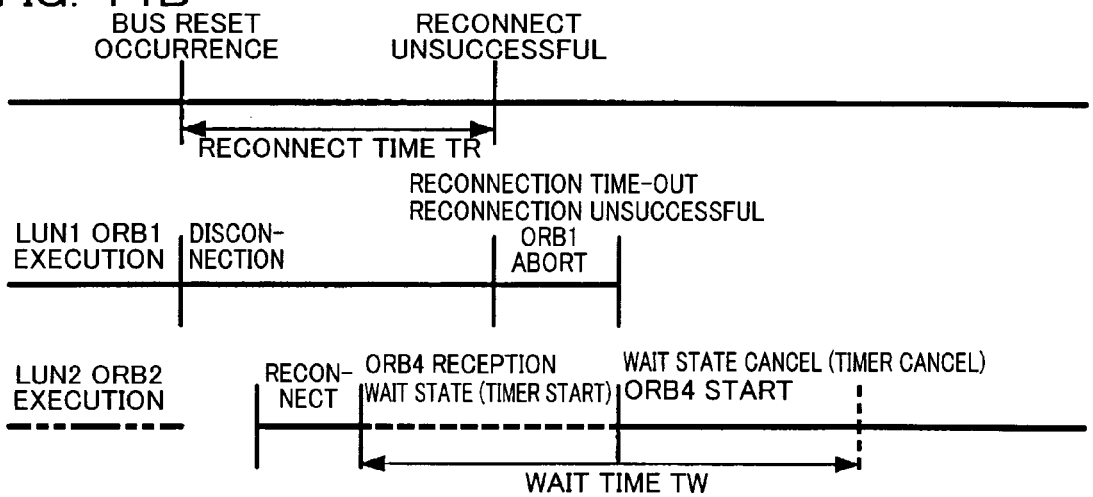

If the reconnection of the PC to the LUN1 is unsuccessful, in other words, if the reconnection by the PC to the LUN1 could not be done before the reconnect time TR elapses, as shown in FIG. 14B, it is no longer necessary for the processing of the ORB4 for the LUN2 to wait the wait time TW. It is usual to have the wait time TW (such as 10 seconds) longer than the reconnect time TR (such as 1 second). Thus, if the wait state of the processing of the ORB4 for the LUN2 is canceled at the point at which the reconnection to the LUN1 is unsuccessful (more precisely, after the ORB1 (command) has been aborted), the processing of the LUN2 can start quicker than if the system waits for the lapse of the wait time TW, enabling an increase in processing efficiency.

Figure 14C:
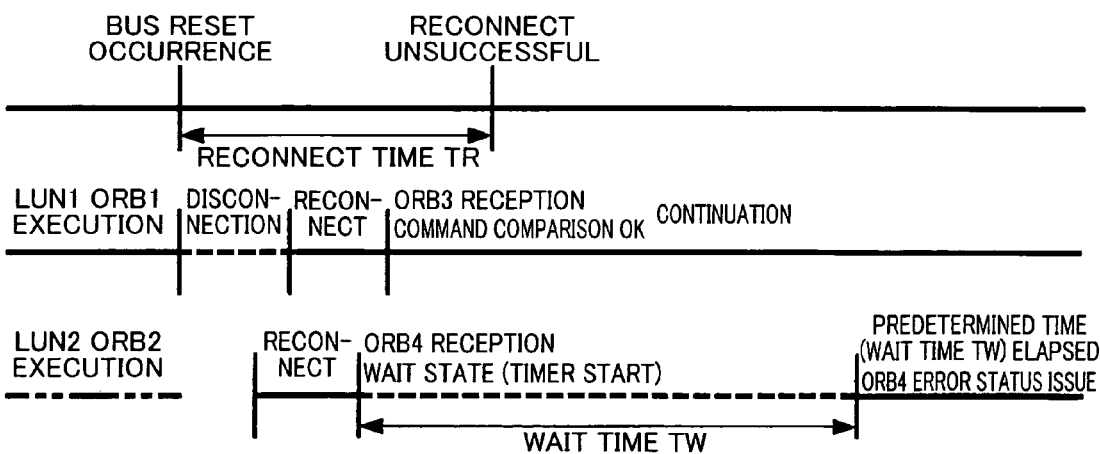

If the processing is made to wait the predetermined time (the wait time TW) but the wait state is not canceled and it doesn't time out (if the processing of the ORB3 for the LUN1 is not completed when the wait time TW has elapsed), an error status is issued to the PC as shown in FIG. 14C.

4. Details of Processing

Figure 15:
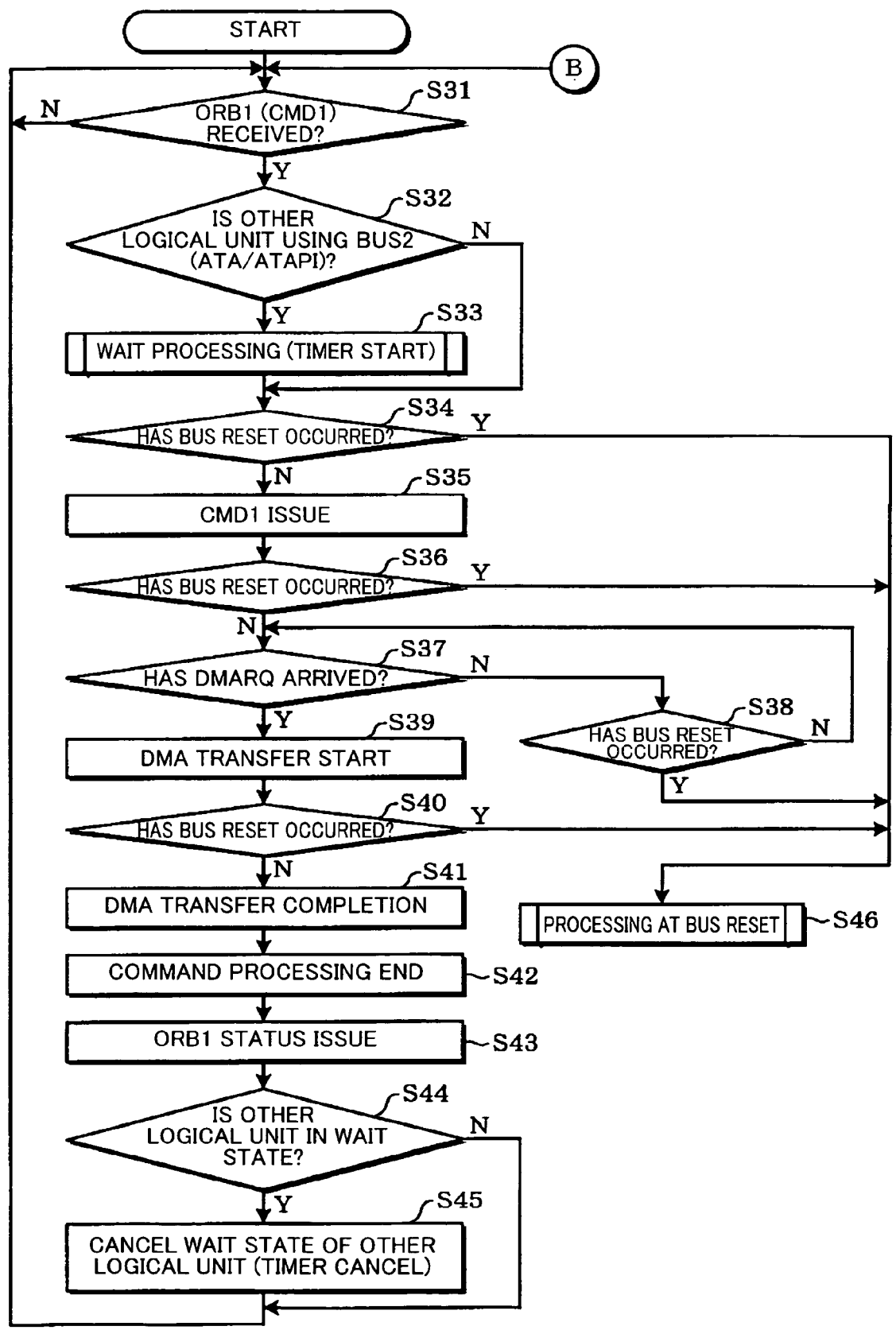
FIG. 15 is a flowchart of details of the processing of this embodiment.
Figure 16:
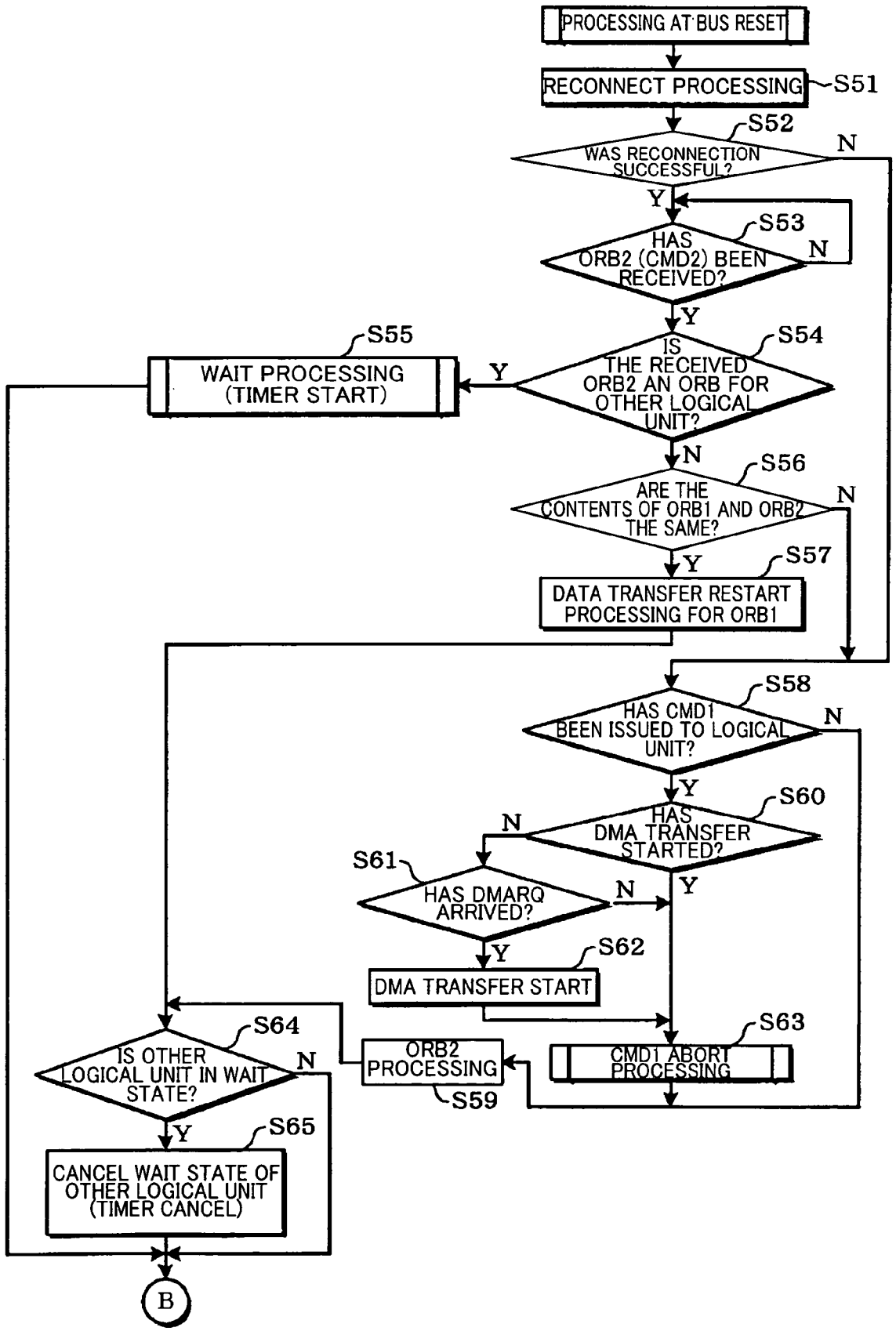
FIG. 16 is a flowchart of further details of the processing of this embodiment.
Figure 17:
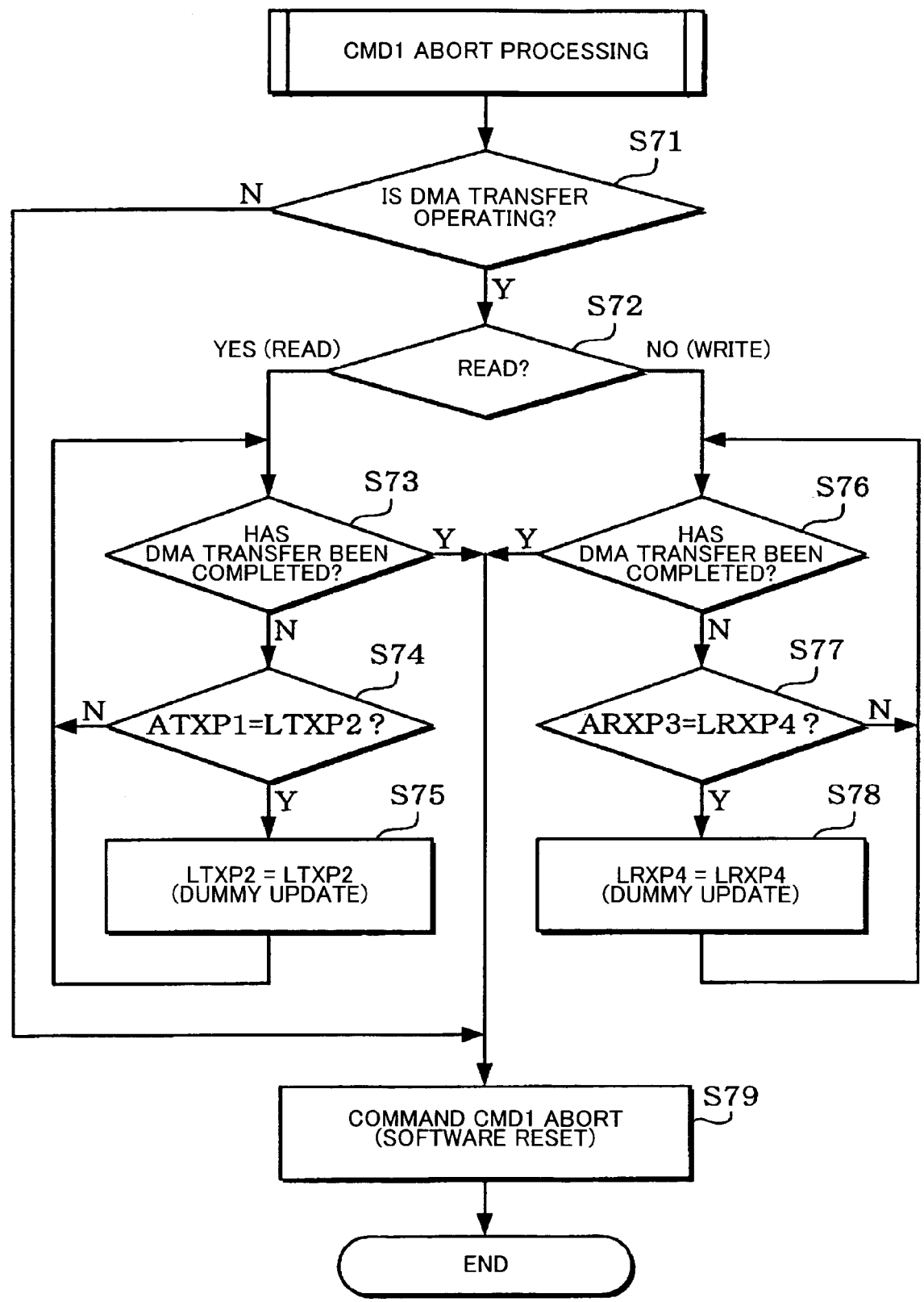
FIG. 17 is a flowchart of command abort processing.
Figure 18:
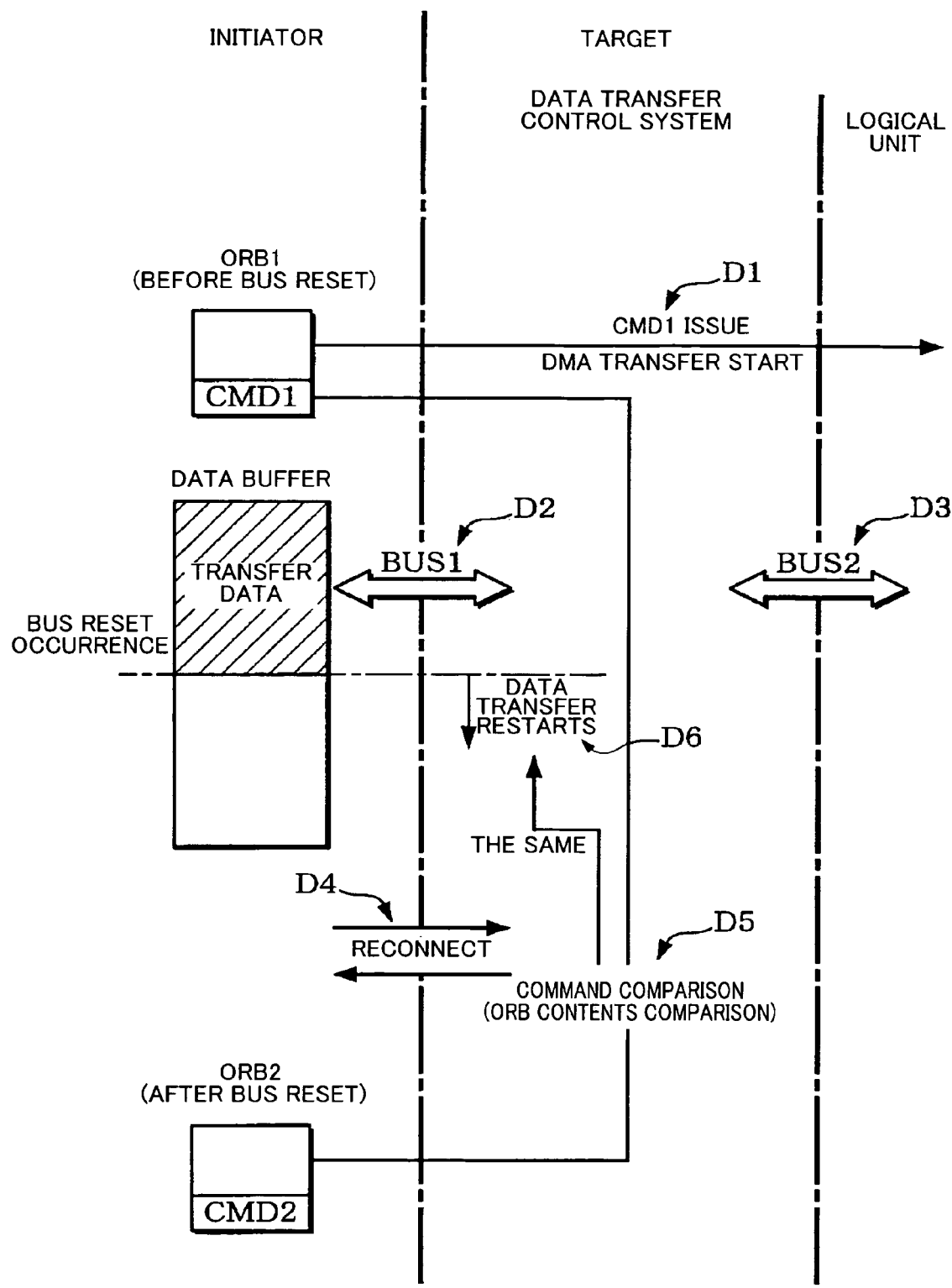
FIG. 18 is illustrative of data transfer restart processing.
Figure 19:
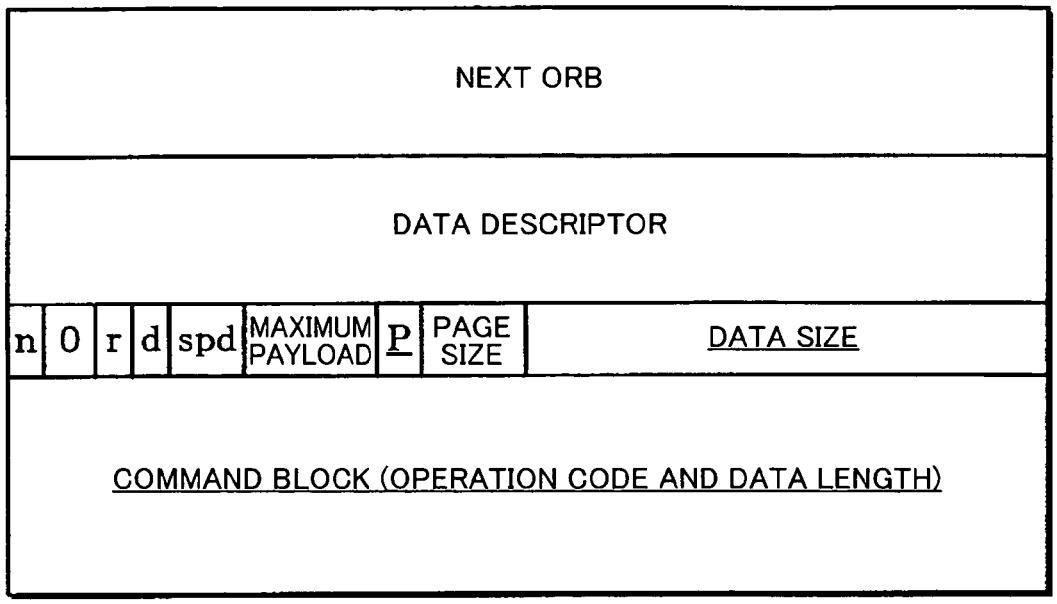
FIG. 19 is illustrative of the comparison of ORB contents.
Figure 19:
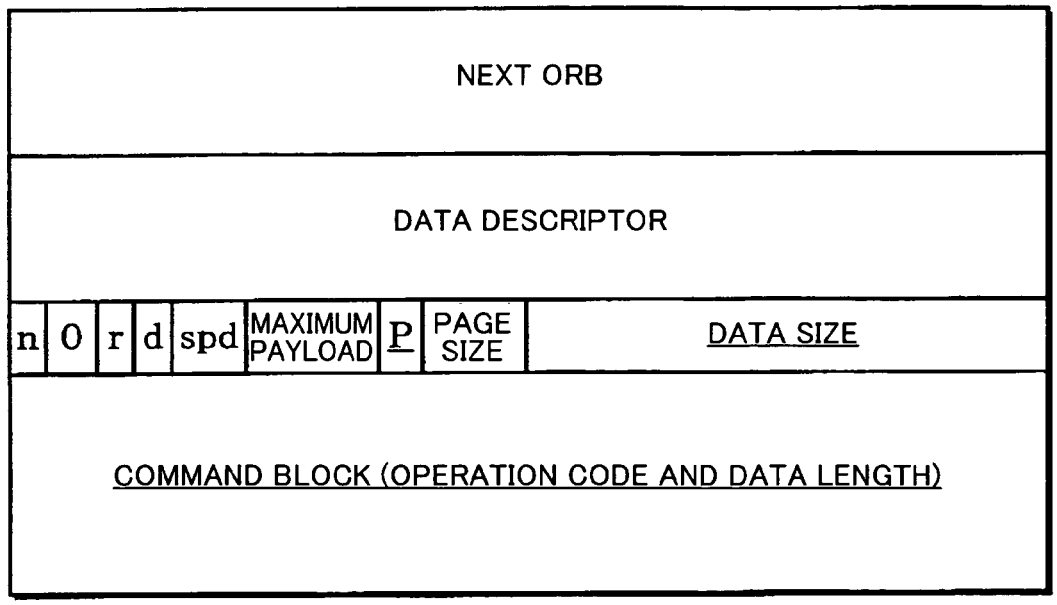
Figure 20:
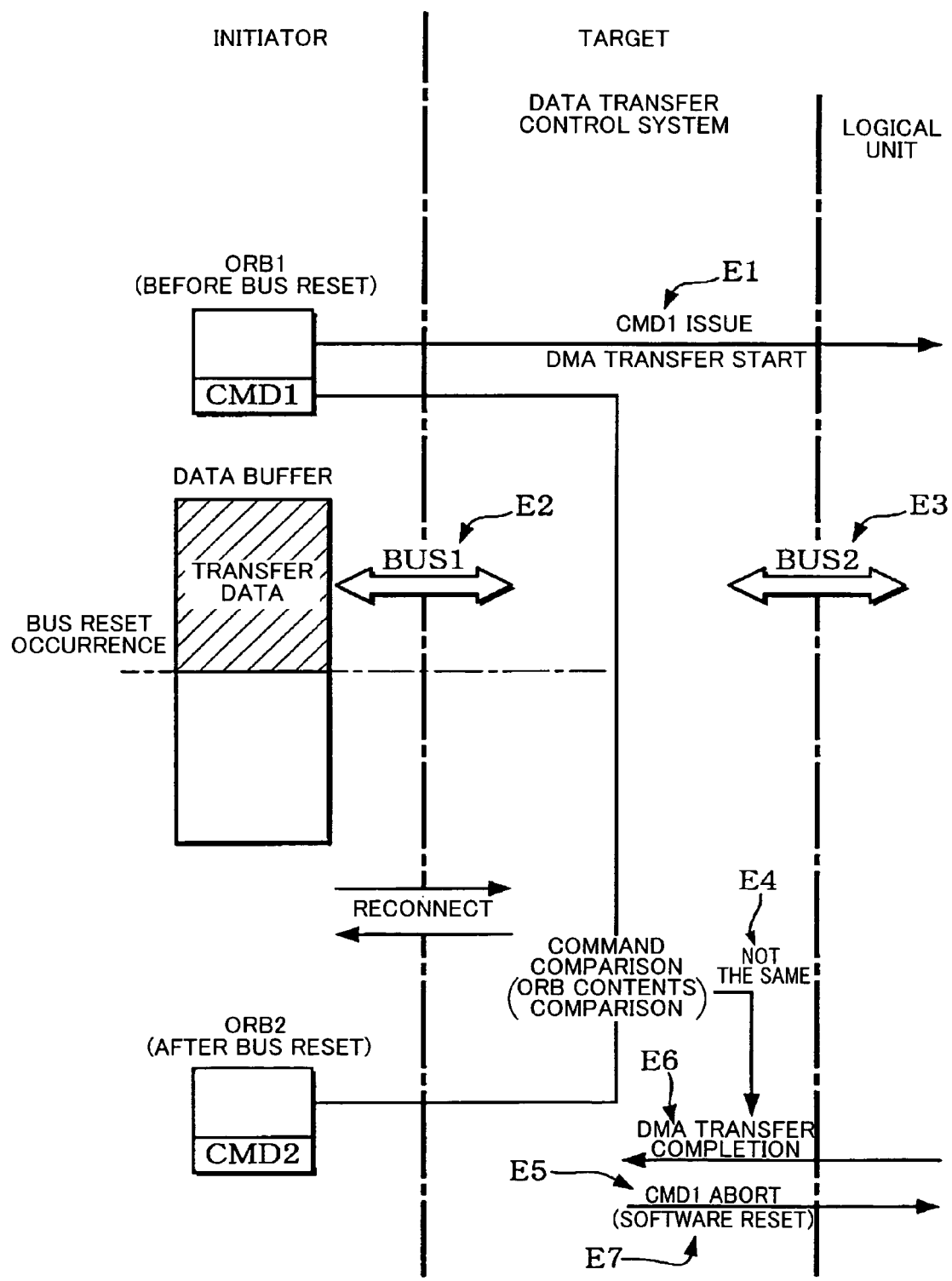
FIG. 20 is illustrative of command abort processing.

The description now turns to detailed examples of the processing of the data transfer control system of this embodiment, with reference to the flowcharts of FIGS. 15 to 17 and the illustrative views of FIGS. 18 to 20.

If the ORB1 including a command CMD1 (a command block ORB before the bus reset occurs, hereinafter the same) is received (step S31), the systems determine whether or not the other logical unit is using the BUS2 (step S32). If it is using the BUS2, the received ORB1 is made to wait by the wait processing of FIG. 8 (step S33).

The system then determines whether or not a bus reset has occurred (step S34). If a bus reset has not occurred, the system issues the command CMD1 included within the thus-received ORB1, to the logical unit (storage device), as shown at D1 of FIG. 18 (step S35). In other words, commands (such as read, write, mode sense, or mode select) that are compatible with SCSI are used with SBP-2, and the logical units use those commands to perform operations such as read and write. The data transfer control system 10 of this embodiment extracts the command CMD1 that is included within the ORB1 and issues that CMD1 (the converted CMD1) to the logical units through the interface circuit and the BUS2 (ATA/ATAPI).

After the CMD1 has been issued, the system determines whether or not a bus reset has occurred (step S36). If no bus reset has occurred, the system determines whether or not DMARQ has arrived from the logical units through the BUS2 (step S37). In other words, signals such as DMARQ that is a DMA transfer request and DMACK that is acknowledgement of DMARQ are defined for the BUS2 that conforms to ATA/ATAPI. After the interface circuit of the logical unit has made DMARQ active, DMA transfer starts when the interface circuit of the data transfer control system makes DMACK active.

If DMARQ does not arrive, the system determines whether or not a bus reset has occurred (step S38). If no bus reset has occurred, the system determines whether or not DMARQ has arrived, then repeats steps S37 and S38 until DMARQ does arrive.

When DMARQ arrives, processing to make DMACK active is done, and the start of DMA transfer is instructed (step S39). Data transfer is done through the BUS1 (IEEE 1394) and the BUS2 (ATA/ATAPI), as shown at D2 and D3 in FIG. 18.

The system then determines whether or not a bus reset has occurred (step S40), and, if DMA transfer is complete (step S41), the command processing for the ORB1 ends (step S42), and the status of the ORB1 is issued to the PC (the personal computer 2) (step S43). This ends the series of command processing for the ORB1.

The system then determines whether or not the other logical unit is in the wait state (step S44). If the other logical unit is in the wait state, the system cancels the timer, canceling the wait state (step S45).

If it is determined in steps S34, S36, S38, or S40 shown in FIG. 15 that a bus reset has occurred, the processing for bus reset is performed (step S46). Flowcharts of this processing during a bus reset are shown in FIGS. 16 and 17.

First of all, reconnect processing to wait for a reconnect from the initiator is done, as shown at D4 of FIG. 18 (step S51). If the PC reconnect does not succeed, the flow moves to step S58. If the reconnect does succeed and the ORB2 including a command CMD2 has been received, the system then determines whether or not the thus-received ORB2 is an ORB for the other logical unit (step S54). If it is an ORB for the other logical unit, the processing for the thus-received ORB2 is made to wait (step S55 and FIG. 8).

If it is not an ORB for the other logical unit, command comparison processing is done to compare the contents of the ORB 1 (CMD1) before the bus reset and the ORB2 (CMD2) after the bus reset (step S56). Specifically, the page table existence flag P, the data size, operation codes (codes distinguishing write command or read command) within the command block (command set) field, and the data length included within the ORBs are compared. If the ORBs include ORB identification information (such as serial numbers), that identification information could also be compared. Note that the values of data descriptors are compared if no page table is used, but the numbers of segments are compared if a page table is used. Comparing the information in the manner described above makes it possible to reliably determine whether or not the ORB1 before the bus reset and the ORB2 after the bus reset are the same, using simple processing.

If it has been determined that the contents of the ORB1 and the ORB2 are the same, restart processing for data transfer in accordance with the ORB1 is performed (step S57). This makes it possible to ensure that data transfer can restart as a continuation from the point at which the bus reset occurred, as shown at D6 in FIG. 18. Note that this data transfer restart processing is transfer processing for the remaining DMA transfer data and processing equivalent to steps S41 to S43 of FIG. 15.

If it is determined that the contents of the ORB1 and the ORB2 are not the same, as shown at E4 of FIG. 20, the system determines whether or not the CMD1 included by the ORB1 has already been issued to the logical unit (step S58). If the CMD1 has not been so issued, the system does not perform command abort processing and moves on to processing of the ORB2 that has been newly transferred in (step S59). With the thus-configured embodiment, if a bus reset occurred during the processing of the CMD1, abort processing is done if it is determined that the CMD1 has been issued (step S63), but abort processing is not done if it determined that the CMD1 has not been issued. The flow then moves on to the processing of the ORB2 (step S59).

If the CMD1 has already been issued to the logical unit, on the other hand, the system determines whether or not the DMA transfer has already started (step S60). If it has started, the system moves on to abort processing for the command CMD1 (step S63), as shown at E5 in FIG. 20. If the CMD1 has not been issued, on the other hand, the system determines whether or not the DMA transfer request DMARQ has arrived (step S61), and, if DMARQ has not arrived, it moves on to CMD1 abort processing. If DMARQ has arrived, on the other hand, the system moves on to CMD1 abort processing (step 62) after instructing the start of DMA transfer. When CMD1 abort processing ends, the flow moves on to processing for the ORB2 (CMD2) (step S59). This ORB2 processing is equivalent to that of steps S35 to S43 of FIG. 15.

The system then determines whether or not the other logical unit is in the wait state (step S64). If the other logical unit is in the wait state, the timer is canceled to cancel the wait state.

A flowchart relating to CMD1 abort processing is shown in FIG. 17. First of all, the system determines whether or not DMA transfer is operating (step S71). It is possible to determine that DMA transfer is not operating at step S71 of FIG. 17 if it is determined that DMA transfer has not started at step S60 of FIG. 16 and determined that DMARQ has not yet arrived at step S61, by way of example. In such a case, the command CMD1 is aborted without performing the dummy data transfer control processing of steps S72 to S78. This makes it possible to omit the processing of steps S72 to S78, making the processing more efficient.

If it has been determined that DMA transfer is operating, the system determines whether the command CMD1 is a read command or a write command (step S72). If the CMD1 is a read command, the system then determines whether or not the DMA transfer for the CMD1 has been completed, as shown at E6 in FIG. 20 (step S73). The dummy data transfer (read) processing of steps S73 to S75 is done with respect to the logical unit until the DMA transfer is complete. If it is determined that the DMA transfer is complete, abort processing for the command CMD1 is done, as shown at E7 in FIG. 20 (step S79).

Similarly, if the CMD1 is a write command, the system then determines whether or not the DMA transfer for the CMD1 has been completed (step S76). The dummy data transfer (write) processing of steps S76 to S78 is done with respect to the logical unit until the DMA transfer is complete. If it is determined that the DMA transfer is complete, abort processing for the command CMD1 is done (step S79).

Note that the command abort processing could be implemented by a software reset that is defined by ATA/ATAPI, by way of example. Specifically, this software reset could be executed by setting an SRST bit of a device control register of the interface circuit of the logical unit to 1. This setting of a value in the register can be implemented by the interface circuit of the data transfer control system accessing the register of the interface circuit, by PIO transfer using BUS2 signals such as CS[1:0], DA[2:0], DIOW, and DIOR.

With this embodiment as described above, the command CMD1 issued by the logical unit before the bus reset (see step S35 of FIG. 15 and E1 in FIG. 20) is aborted (see step S79 of FIG. 17 and E7 in FIG. 20) after the DMA transfer (see step S39 of FIG. 15, step S62 of FIG. 16, and E3 in FIG. 20) started by the ORB1 (CMD1) has been completed. This ensures that the command CMD1 is aborted after the DMA transfer through the logical unit and the BUS2 has ended normally. Since the logical unit can therefore complete the DMA transfer normally, it is possible to prevent a situation in which the logical unit hangs. In addition, since the DMA transfer through the BUS2 until the command CMD1 is aborted is done by dummy data transfers, there is no adverse effect on the processing of the PC.

In particular, a logical unit (storage device) that is provided with the ATA (IDE)/ATAPI interface was originally designed as an internal storage device for PCs, so it was not designed from consideration of the occurrence of a IEEE 1394 bus reset during DMA transfer. It is therefore highly likely that, if the logical unit is connected to the data transfer control system of this embodiment, which is provided with an IEEE 1394 and ATA/ATAPI bridge function, the occurrence of an unexpected bus reset could cause the logical unit to hang. Since this embodiment makes it possible to abort a command after DMA transfer is complete, it enables the prevention of such a hang-up before it occurs.

5. Transfer of Dummy Data

The description now turns to the transfer of dummy data in steps S73 to S75 and S76 to S78 of FIG. 17, with reference to FIGS. 21A to 21E and 22A to 22E.

FIGS. 21A to 21E are illustrative of pointer control of the data buffer 40 during the reading of data of the logical unit by the PC (during data transmission of the data transfer control system). In FIGS. 21A to 21E, a pointer ATXP1 (a first pointer) is a pointer for writing transfer data from the BUS2 (logical units) to the data buffer 40, which is updated every time transfer data is written from the BUS2. Similarly, a pointer LTXP2 (a second pointer) is a pointer for reading out transfer data from the data buffer 40 to the BUS1 (the PC, IEEE 1394), which is updated every time transfer data is read out to the BUS1. The updating of these pointers is done by the pointer management section 39.

Figure 21A:
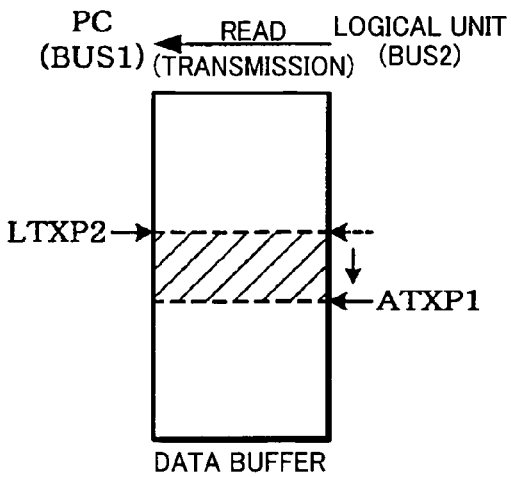
FIGS. 21A to 21E are illustrative of a pointer control method (during read) that implements dummy data transfer processing.
Figure 21B:
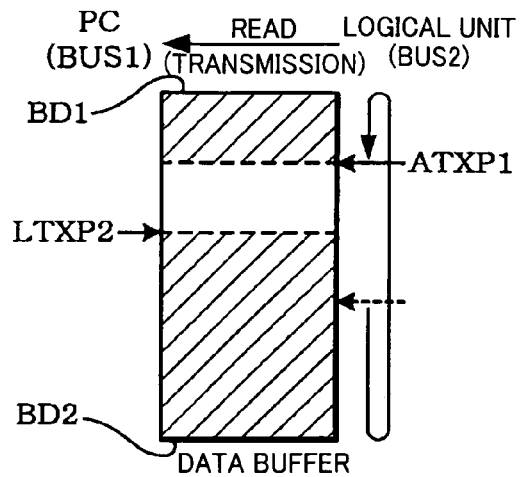

As shown in FIG. 21A, every time transfer data from the BUS2 is written by the interface circuit 30 to the data buffer 40, the pointer ATXP1 is updated and the position it indicates moves downward (in the direction in which data accumulates). The pointer ATXP1 is managed by a ring buffer method. Thus, when the pointer ATXP1 reaches a lower boundary BD2 of the record area, ATXP1 returns to an upper boundary BD1 of the record area (forms a ring), as shown in FIG. 21B.

Figure 21C:
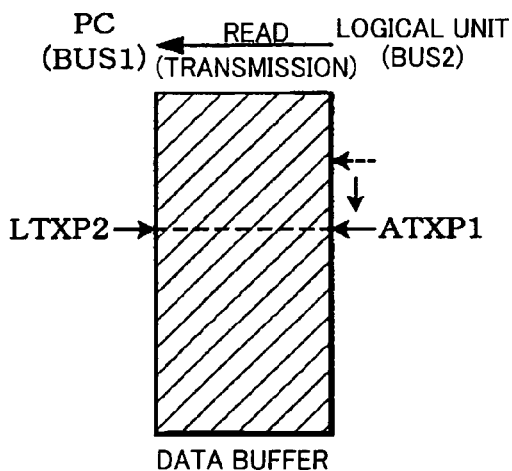

When it is determined that ATXP1=LTXP2 (step S74 of FIG. 17), data has accumulated in the entire record area of the data buffer 40, as shown in FIG. 21C. Note that the shaded portions of FIGS. 21A to 21E denote accumulated data.

Figure 21D:
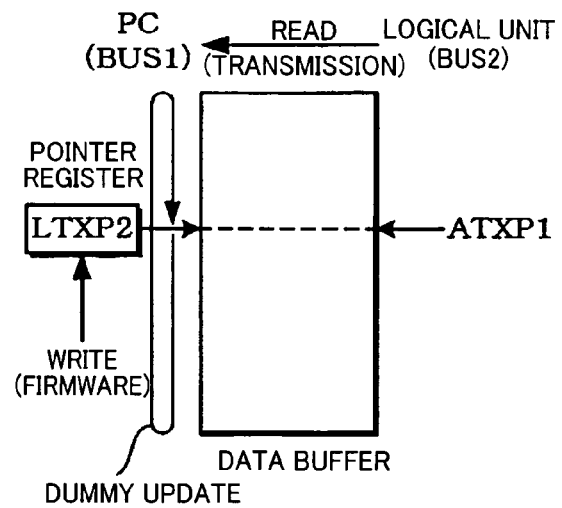
Figure 21E:
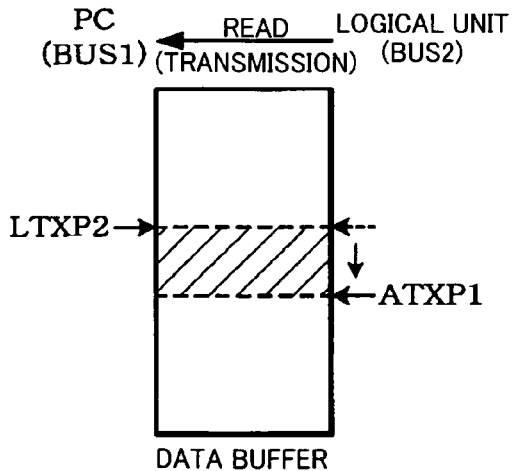

When that happens with this embodiment, the same value as LTXP2 is re-written to an LTXP2 pointer register, as shown in FIG. 21D (step S77 of FIG. 17). This performs a dummy update of the pointer LTXP2, giving a result that is similar to the read-out of all the accumulated data in the record area. The pointer ATXP1 is subsequently updated as shown in FIG. 21E to perform a pseudo read-out, and the transfer data is written from the BUS2 to the record area. The pointer control of FIGS. 21A to 21E is repeated until the DMA transfer is complete (step S73 of FIG. 17), to transfer dummy data over the BUS2.

This embodiment configured as described above controls the transfer of dummy data by performing dummy updates of LTXP2 (the second pointer) in such a manner that LTXP2 is not overtaken by the ATXP1 (the first pointer) that is updated every time transfer data from the BUS2 is written.

FIGS. 22A to 22E are illustrative of pointer control of the data buffer 40 during the writing of data by the PC to a logical unit (during data reception of data transfer control system). In FIGS. 22A to 22E a pointer ARXP3 (a third pointer) is a pointer for reading out transfer data from the data buffer 40 to the BUS2, which is updated every time transfer data is read out to the BUS2. Similarly, a pointer LRXP4 (a fourth pointer) is a pointer for writing transfer data from the BUS1 to the data buffer 40, which is updated every time transfer data is written from the BUS1. The updating of these pointers is done by the pointer management section 39.

Figure 22A:
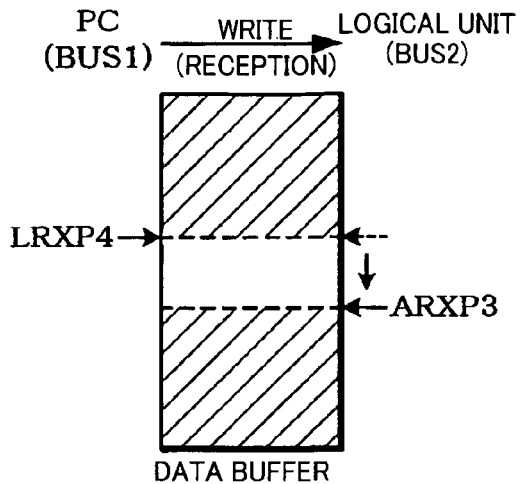
FIGS. 22A to 22E are illustrative of a pointer control method (during write) that implements dummy data transfer processing.
Figure 22B:
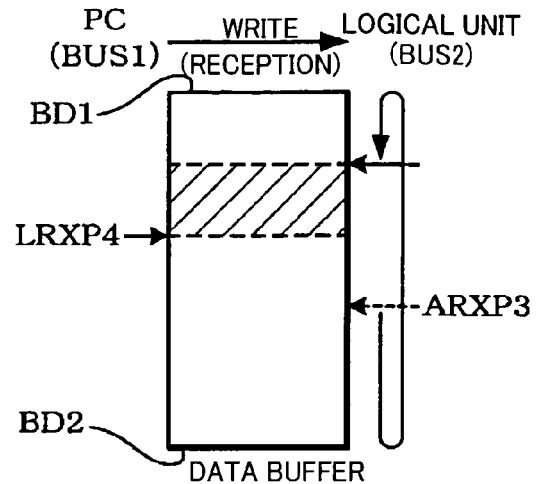
Figure 22C:
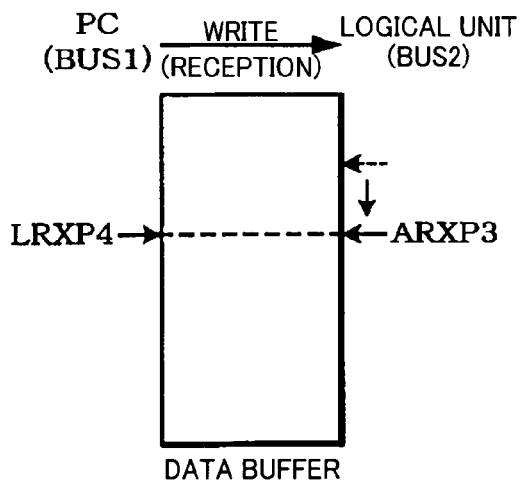

As shown in FIG. 22A, every time transfer data is read out from the data buffer 40 to the BUS2, the pointer ARXP3 is updated and the position it indicates moves downward. The pointer ARXP3 is managed by a ring buffer method. Thus, when the pointer ATXP3 reaches the lower boundary BD2 of the record area, ATXP3 returns to the upper boundary BD1, as shown in FIG. 22B. When it is determined that ARXP3=LRXP4 (step S77 of FIG. 17), all the data in the entire record area of the data buffer 40 has been read out, as shown in FIG. 22C.

Figure 22D:
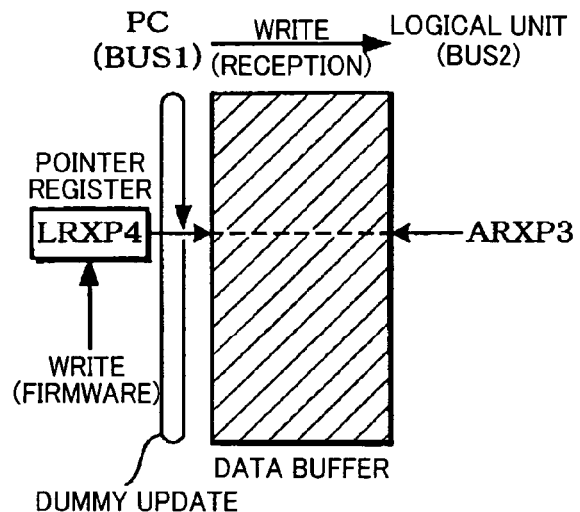
Figure 22E:
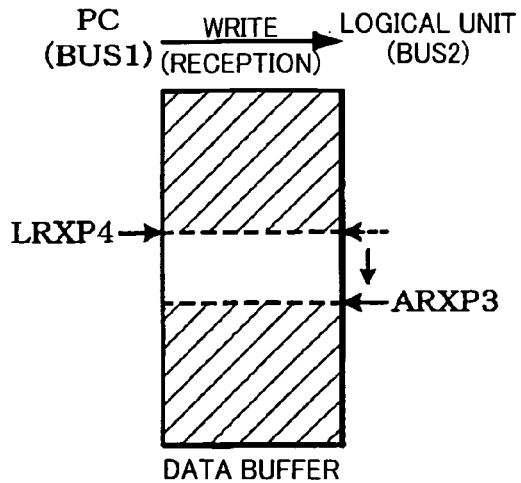

When that happens with this embodiment, the same value as LRXP4 is rewritten to an LRXP4 pointer register, as shown in FIG. 22D (step S78 of FIG. 17). This performs a dummy update of the pointer LRXP4, giving a result that is similar to the writing of data to the entire record area. The pointer ARXP3 is updated as shown in FIG. 22E and transfer data is read to the BUS2 from the record area in which it was pseudo-written. The pointer control of FIGS. 22A to 22E is repeated until the DMA transfer is complete (step S76 of FIG. 17), to transfer dummy data over the BUS2.

This embodiment configured as described above implements transfer control of dummy data by performing dummy updates of ARXP4 (the fourth pointer) in such a manner that LTXP4 is not overtaken by the ATXP3 (the third pointer) that is updated every time transfer data to the BUS2 is read out.

The above-described embodiment performs pseudo transfers of dummy data through the BUS2 to or from the logical units (LUN1 and LUN2) until the DMA transfer is complete, then aborts the command CMD1 after the DMA transfer is complete. The reading and writing of transfer data on the PC side is done in a pseudo fashion by dummy updates of the pointers LTXP2 and LRXP4, as shown in FIGS. 21D and 22D. It is therefore possible to prevent any adverse effect on the processing of the PC due to the continuing DMA transfer up until the command CMD1 is aborted. The processing of the newly arrived the ORB2 (CMD2) that is sent to the PC after the bus reset can be executed as appropriate after the CMD1 has been aborted.

Note that the method of performing dummy updates of the pointers LTXP2 and LRXP4 is not limited to that shown in FIGS. 21A to 22E, at least so long as LTXP2 and LRXP4 are controlled so as not to overtake the pointers ATXP1 and ARXP3. Similarly, the dummy data transfer processing need not be done by the pointer control shown in FIGS. 21A to 22E; it could also be implemented by providing a dedicated hardware circuit for dummy data transfers.

Note that the present invention is not limited to this embodiment and thus various modifications thereto are possible within the scope of the invention laid out herein. For example, terminology (such as: IEEE 1394, ATA/ATAPI, SBP-2, ORB, PC, or CPU) that is derived from generic terminology defined within this document (such as: first interface standard, second interface standard, upper-level first protocol of the first interface standard, command packet, device, and processor) could be replaced by other terminology used within this document and figures in either a broad sense or specifically.

The configurations of the data transfer control system and electronic instrument of the present invention are not limited to those shown in FIG. 5 and thus various modifications thereto are possible. For example, some of the circuit blocks and function blocks used in FIG. 5 could be omitted, or the connective relationship therebetween could be modified. The logical unit connected to the second bus (the BUS2) is also not limited to a storage device. In addition, the connective configuration of the physical-layer circuit, the link-layer circuit, and the data buffer is not limited to that shown in FIG. 5.

This embodiment was described as relating to a configuration in which the functions of components such as the wait processing section, command processing section, command abort section, command comparison section, and transfer restart section were implemented by firmware (programs), but all or some of these functions could equally well be implemented by a hardware circuit. Similarly, the present invention is particularly useful for a bus reset under IEEE 1394, but it can also be applied to any reset in which at least node topology information is cleared.

The present invention can be applied to various electronic instruments (such as hard disk drives, optical disk drives, optomagnetic disk drives, PDAs, expansion devices, audio equipment, digital video cameras, mobile phones, printers, scanners, TVs, VTR, telephones, display devices, projectors, personal computers or electronic organizers).

In addition, this embodiment was described as relating to a configuration in which the present invention was applied to data transfer by the IEEE 1394, SBP-2, and ATA/ATAPI standards. However, the present invention can also be applied to standards based on concepts similar to those of IEEE 1394 (P1394a), SBP-2 (SBP), or ATA/ATAPI, or on standards derived from IEEE 1394, SBP-2, and ATA/ATAPI.

What is claimed is:

1. A data transfer control system for transferring data through a first bus and a second bus, the data transfer control system comprising:

a buffer controller which controls access to a data buffer in which transfer data is temporarily stored; and a transfer controller which controls data transfer between a device connected to the first bus and a plurality of logical units connected to the second bus, the plurality of logical units including a first logical unit and a second logical unit, the transfer controller including:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when a bus reset occurs during the processing of the command packet for the first logical unit and a command packet that is received after the bus reset occurs is the command packet for the second logical unit, the wait processing section waiting processing of the command packet for the second logical unit for a predetermined time, when a bus reset occurs during the processing of the command packet for the first logical unit and a command packet that is received after the bus reset occurs is the command packet for the second logical unit, and issuing an error status with respect to the device connected to the first bus when a wait state is not canceled even after processing has waited for the predetermined time.

2. The data transfer control system as defined by claim 1, the wait processing section performing processing to restart data transfer to or from the first logical unit, when a bus reset occurs during the processing of the command packet for the first logical unit and a command packet that is received after the bus reset occurs is the command packet for the first logical unit.

3. The data transfer control system as defined by claim 1, the first bus being a bus in which data transfer by the IEEE 1394 standard is performed, and the second bus being a bus in which data transfer by the ATA/ATAPI standard is performed.

4. A data transfer control system for transferring data through a first bus and a second bus, the data transfer control system comprising:

a buffer controller which controls access to a data buffer in which transfer data is temporarily stored; and a transfer controller which controls data transfer between a device connected to the first bus and a plurality of logical units connected to the second bus, the plurality of logical units including a first logical unit and a second logical unit, the transfer controller including:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when the command packet for the second logical unit is received while the second bus is being used by the first logical unit, the transfer controller including a command abort section which aborts a command issued by a logical unit among the plurality of logical units, the command processing section issuing the command indicated by the command packet to the logical unit connected to the second bus, and starting DMA transfer to or from the logical unit, when a command packet is received from the device connected to the first bus, and the command abort section aborting the command that has been issued to the logical unit connected to the second bus based on the command packet, after the DMA transfer started by the command packet has been completed.

5. The data transfer control system as defined by claim 4, the transfer controller including a command comparison section which compares a content of a first command packet and a content of a second command packet when the bus reset occurs while the first command packet is being processed, the first command packet being transferred through the first bus before the bus reset occurs, the second command packet being transferred through the first bus after the bus reset occurs, and the first command packet and the second command packet being issued to the same one logical unit among the plurality of logical units, the command abort section aborting a command that has been issued to the logical unit connected to the second bus based on the first command packet after a completion of the DMA transfer that has started based on the first command packet, when it is determined that the content of the second command packet differ from the content of the first command packet.

6. The data transfer control system as defined by claim 4, the command abort section controlling a transfer of dummy data to or from the logical unit connected to the second bus, until the DMA transfer is complete.

7. The data transfer control system as defined by claim 4, the first bus being a bus in which data transfer by the IEEE 1394 standard is performed, and the second bus being a bus in which data transfer by the ATA/ATAPI standard is performed.

8. An electronic instrument comprising:

the data transfer control system as defined by claim 1; and the plurality of logical units connected to the second bus.

9. An electronic instrument comprising:

the data transfer control system as defined by claim 4; and the plurality of logical units connected to the second bus.

10. A data transfer control system for transferring data through a first bus and a second bus, the data transfer control system comprising:

a buffer controller which controls access to a data buffer in which transfer data is temporarily stored; and a transfer controller which controls data transfer between a device connected to the first bus and a plurality of logical units connected to the second bus, the plurality of logical units including a first logical unit and a second logical unit, the transfer controller including:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when a bus reset occurs during the processing of the command packet for the first logical unit and a command packet that is received after the bus reset occurs is the command packet for the second logical unit, the wait processing section canceling a wait state of the processing of the command packet for the second logical unit, when a bus reset occurs during the processing of the command packet for the first logical unit and the device connected to the first bus does not succeed with a reconnection request performed for the first logical unit after the bus reset occurs.

11. A data transfer control system for transferring data through a first bus and a second bus, the data transfer control system comprising:

a buffer controller which controls access to a data buffer in which transfer data is temporarily stored; and a transfer controller which controls data transfer between a device connected to the first bus and a plurality of logical units connected to the second bus, the plurality of logical units including a first logical unit and a second logical unit, the transfer controller including:

a command processing section which starts data transfer to or from the first logical unit connected to the second bus based on a command indicated by a command packet for the first logical unit when the command packet for the first logical unit is received from the device connected to the first bus, and starts data transfer to or from the second logical unit connected to the second bus based on a command indicated by a command packet for the second logical unit when the command packet for the second logical unit is received from the device connected to the first bus; and a wait processing section which waits processing of the command packet for the second logical unit that has been received, when a bus reset occurs during the processing of the command packet for the first logical unit and a command packet that is received after the bus reset occurs is the command packet for the second logical unit, the transfer controller including a command abort section which aborts a command issued by a logical unit among the plurality of logical units, the command processing section issuing the command indicated by the command packet to the logical unit connected to the second bus, and starting DMA transfer to or from the logical unit, when a command packet is received from the device connected to the first bus, and the command abort section aborting the command that has been issued to the logical unit connected to the second bus based on the command packet, after the DMA transfer started by the command packet has been completed.

12. The data transfer control system as defined by claim 11, the transfer controller including a command comparison section which compares a content of a first command packet and a content of a second command packet when the bus reset occurs while the first command packet is being processed, the first command packet being transferred through the first bus before the bus reset occurs, the second command packet being transferred through the first bus after the bus reset occurs, and the first command packet and the second command packet being issued to the same one logical unit among the plurality of logical units, the command abort section aborting a command that has been issued to the logical unit connected to the second bus based on the first command packet after a completion of the DMA transfer that has started based on the first command packet, when it is determined that the content of the second command packet differ from the content of the first command packet.

13. The data transfer control system as defined by claim 11, the command abort section controlling a transfer of dummy data to or from the logical unit connected to the second bus, until the DMA transfer is complete.

* * * * *